United States Patent
Yashima et al.

(10) Patent No.: US 8,284,453 B2
(45) Date of Patent: Oct. 9, 2012

(54) IMAGE PROCESSING APPARATUS, IMAGE FORMING APPARATUS, IMAGE PROCESSING METHOD, AND RECORDING MEDIUM FOR CHANGING AN IMAGE WIDTH

(75) Inventors: Shun Yashima, Ebina (JP); Yoshiki Matsuzaki, Ebina (JP); Osamu Goto, Ebina (JP); Takeshi Kato, Ebina (JP); Yasuhiro Arai, Ebina (JP); Toshiyuki Kazama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1265 days.

(21) Appl. No.: 11/785,160

(22) Filed: Apr. 16, 2007

(65) Prior Publication Data
US 2008/0089585 A1 Apr. 17, 2008

(30) Foreign Application Priority Data
Oct. 13, 2006 (JP) .................................. 2006-280168

(51) Int. Cl.
G06T 5/00 (2006.01)
H04N 1/407 (2006.01)
H04N 1/409 (2006.01)
G06K 15/00 (2006.01)
G06K 9/40 (2006.01)

(52) U.S. Cl. ........ 358/3.26; 358/1.18; 358/2.1; 382/254

(58) Field of Classification Search .................. None
See application file for complete search history.

(56) References Cited

U.S. PATENT DOCUMENTS

| 6,160,913 | A | * | 12/2000 | Lee et al. | 382/176 |
|---|---|---|---|---|---|
| 6,771,814 | B1 | * | 8/2004 | Nakajima | 382/168 |
| 2001/0043759 | A1 | * | 11/2001 | Eguchi | 382/299 |
| 2003/0202200 | A1 | * | 10/2003 | Terrill et al. | 358/1.14 |
| 2004/0196357 | A1 | * | 10/2004 | Tasaka | 347/248 |
| 2005/0058362 | A1 | * | 3/2005 | Kita | 382/254 |

FOREIGN PATENT DOCUMENTS

| JP | 64-47167 | 2/1989 |
|---|---|---|
| JP | 2-137473 | 5/1990 |
| JP | 07-111589 | 4/1995 |
| JP | 7-182504 | 7/1995 |
| JP | 11-17938 | 1/1999 |
| JP | 2001-5245 | 1/2001 |
| JP | 2003-95687 | 4/2003 |

* cited by examiner

*Primary Examiner* — King Poon
*Assistant Examiner* — Ming Hon
(74) *Attorney, Agent, or Firm* — Morgan, Lewis & Bockius LLP

(57) ABSTRACT

There is provided an image processing apparatus having an image segmentation unit that divides image formation into image areas in a first direction, a random number memory that stores random numbers, a reference position determination unit that determines a reference position so as to vary in a second direction perpendicular to the first direction, a pixel determination unit that determines a pixel as a target to be subjected to correction processing of pixel insertion into or pixel reduction from each of the image areas, for the each of the image areas, according to the stored random numbers and the determined reference position, among pixels in the each of the image areas, and an image width change unit that performs the correction processing on the determined pixel to change an image width of the image information in the first direction.

20 Claims, 14 Drawing Sheets

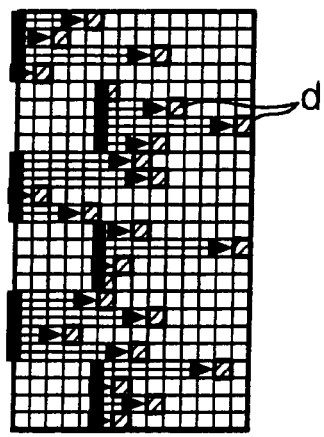
FIG. 15
FIG. 16
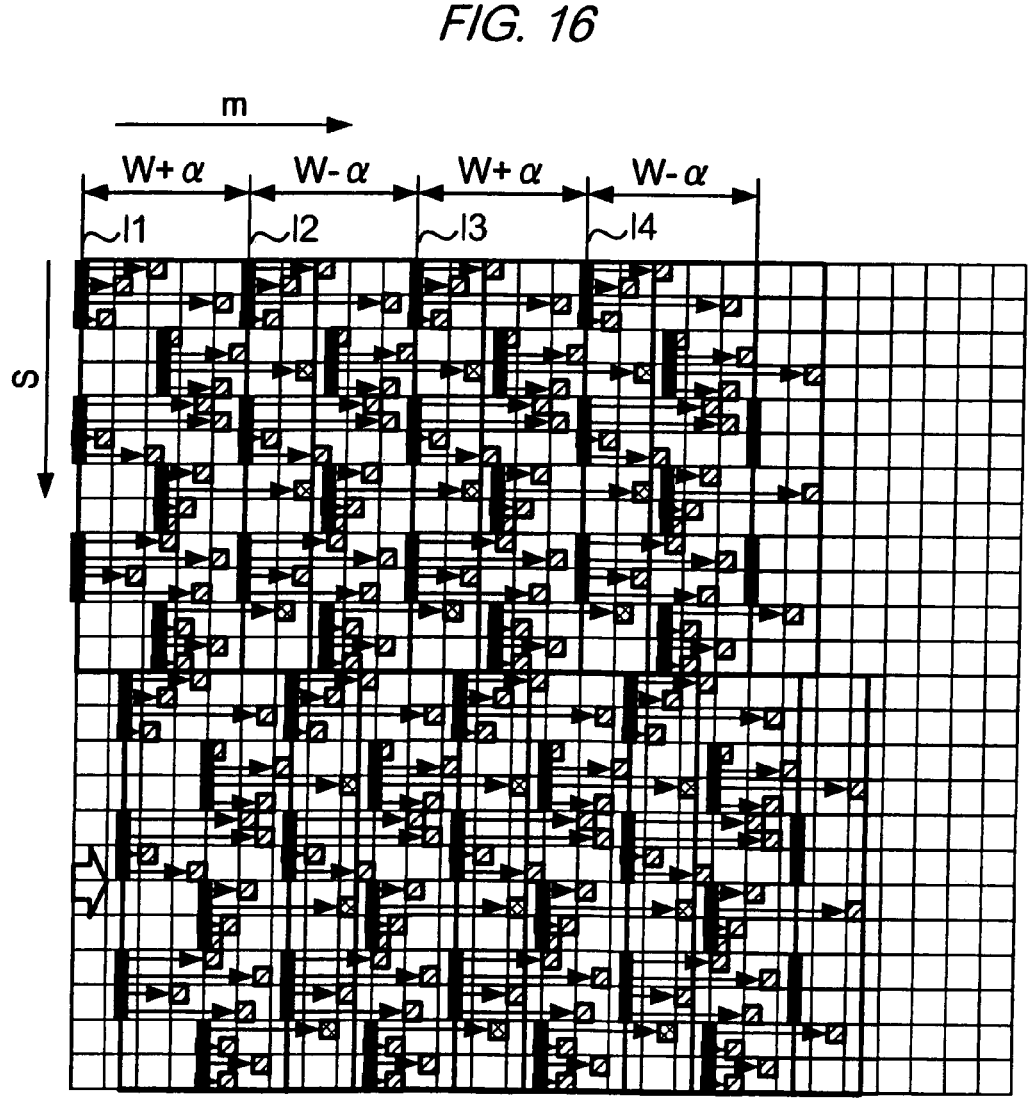

IMAGE PROCESSING APPARATUS, IMAGE FORMING APPARATUS, IMAGE PROCESSING METHOD, AND RECORDING MEDIUM FOR CHANGING AN IMAGE WIDTH

This application is based on and claims priority under 35 USC 119 from Japanese Patent Application No. 2006-280168 filed Oct. 13, 2006.

BACKGROUND

1. Technical Field

The present invention relates to an image processing apparatus, an image forming apparatus, an image processing method, and a recording medium.

2. Related Art

A common image forming apparatus according to an electrophotographic system forms an image on an image carrier such as a photosensitive member, and then transfers the image to a recording material. At the time of transfer, positions of pixels which form the image and which are transferred to the recording material may be incorrectly transferred to positions that are dislocated from desired positions, resulting in a difference in the width of the image from an intended width in the main or sub scanning direction.

SUMMARY

According to an aspect of the present invention, there is provided an image processing apparatus having: an image segmentation unit that divides image information into image areas in a first direction; a random number memory that generates and stores random numbers or stores random numbers generated in advance; a reference position determination unit that determines a reference position so as to vary in a second direction perpendicular to the first direction, the reference position being to be referred to when determining a pixel as a target to be subjected to correction processing of pixel insertion into or pixel reduction from each of the image areas of the image information divided in the first direction; a pixel determination unit that determines the pixel as a target to be subjected to the correction processing, for the each of the image areas, according to the random numbers stored in the random number memory and according to the reference position determined by the reference position determination unit, among pixels in the each of the image areas; and an image width change unit that performs the correction processing on the pixel determined by the pixel determination unit, to change an image width of the image information in the first direction.

BRIEF DESCRIPTION OF THE DRAWINGS

An exemplary embodiment of the present invention will be described in detail based on the following figures, wherein:

FIG. 15 illustrates a method D of the exemplary embodiment; and

FIG. 16 also illustrates the method D of the exemplary embodiment.

DETAILED DESCRIPTION

An exemplary embodiment of the present invention will now be described below.

In the following description, the "main scanning direction" refers to a moving direction of light with which an exposure device irradiates (scans) a surface of an image carrier member when forming a latent image on the image carrier member. On the other side, the "sub scanning direction" is a rotation direction of the image carrier member, i.e., the moving direction of the surface of the image carrier member. These main and sub scanning directions are perpendicular to each other.

The "width of an image" or "image width" is a dimension of an image formed on an intermediate transfer member or a recording sheet, along the main scanning direction of the image. The "height of an image" is another dimension of an image formed on an intermediate transfer member or a recording sheet, along the length of the sub scanning direction of the image.

Figure 1:
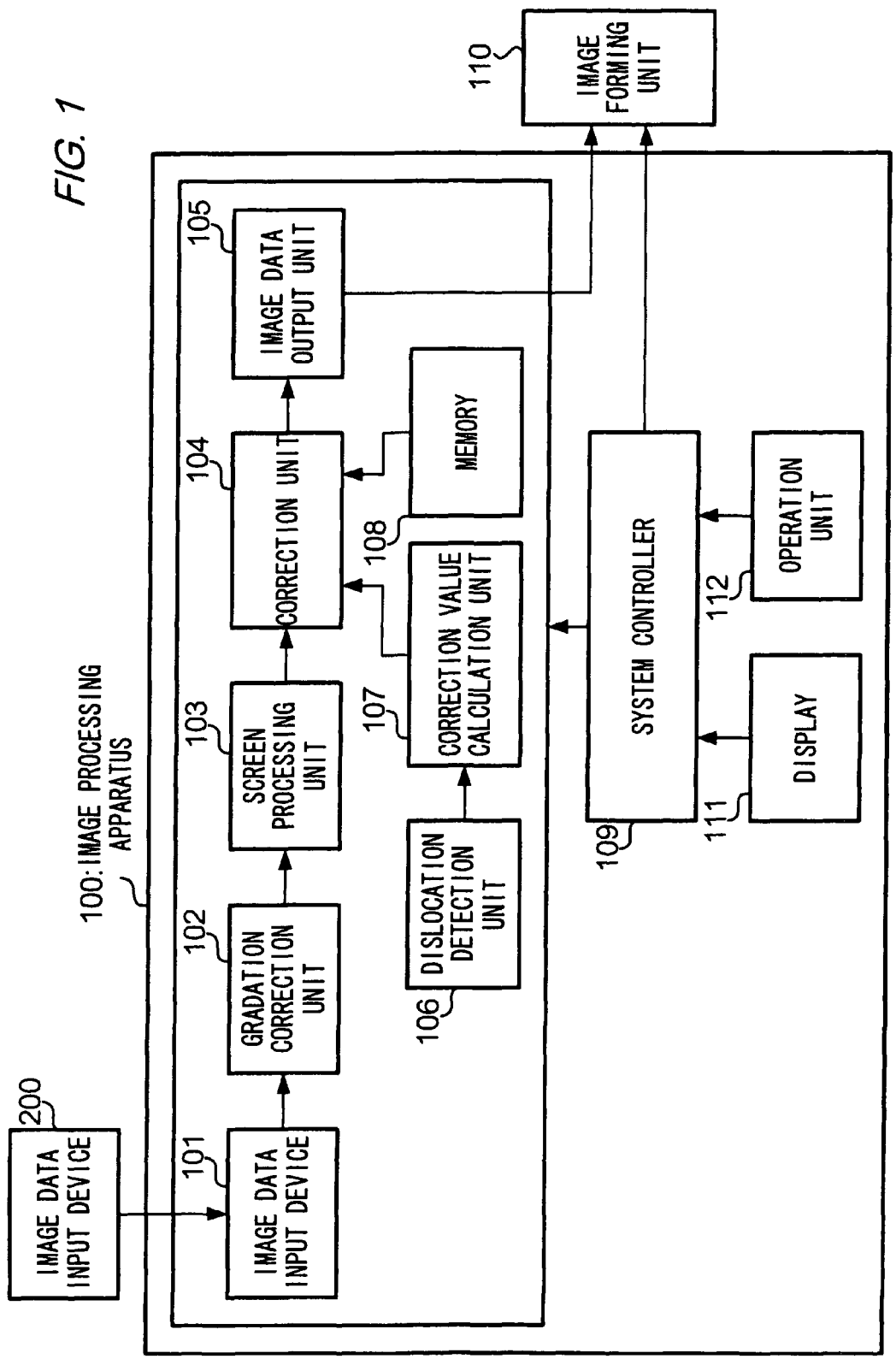
FIG. 1 shows a configuration of an image processing apparatus according to an exemplary embodiment of the invention.

FIG. 1 shows a configuration of a system according to the exemplary embodiment. An image processing apparatus 100 is built in, for example, an electrophotographic image forming apparatus such as a color printer or color copying machine. As shown in the figure, the image processing apparatus 100 includes, an image data input unit 101, a gradation correction unit 102, a screen processing unit 103, a correction unit 104, an image data output unit 105, a dislocation detection unit 106, a correction value calculation unit 107, a memory 108, a system control unit 109, a display unit 111, and an operation unit 112. Among these componential units, the image data input unit 101, gradation correction unit 102, screen processing unit 103, correction unit 104, correction value calculation unit 107, memory 108, and system control unit 109 are constituted by various memories and control circuits, such as an ASIC (Application Specific Integrated Circuit), a CPU (Central Processing Unit), etc.

The image data input unit 101 has a communication circuit, not shown, and receives image data (image information) inputted via a network or a communication line from an image input device 200 such as a scanner. The image data is written in PDL (Page Description Language). The image data input unit 101 performs rasterization based on the image data and generates image data in bitmap format (hereinafter "bitmap data"). The gradation correction unit 102 performs gradation correction, shading correction, and the like on the bitmap data described above. The screen processing unit 103 performs screen processing on the bitmap data subjected to gradation correction by the gradation correction unit 102. The screen processing is to convert multi-valued data into binary data and to express gradation levels each as a number of pixels per a predetermined unit area, the pixels being expressed by the binary data In a type of screen structure, for example, halftone dots each constituted of plural pixels are arrayed regularly. In another type of screen structure, plural lines each constituted of plural continuously arrayed pixels are disposed regularly. If the image data which the image data input unit 101 receives does not require screen processing similarly to binary data, bit map data is supplied to the correction unit 104 from the gradation correction unit 102, avoiding the screen processing unit 103.

An image forming unit 110 forms an image on a recording material, depending on an image data set supplied from the image processing apparatus 100.

Figure 2:
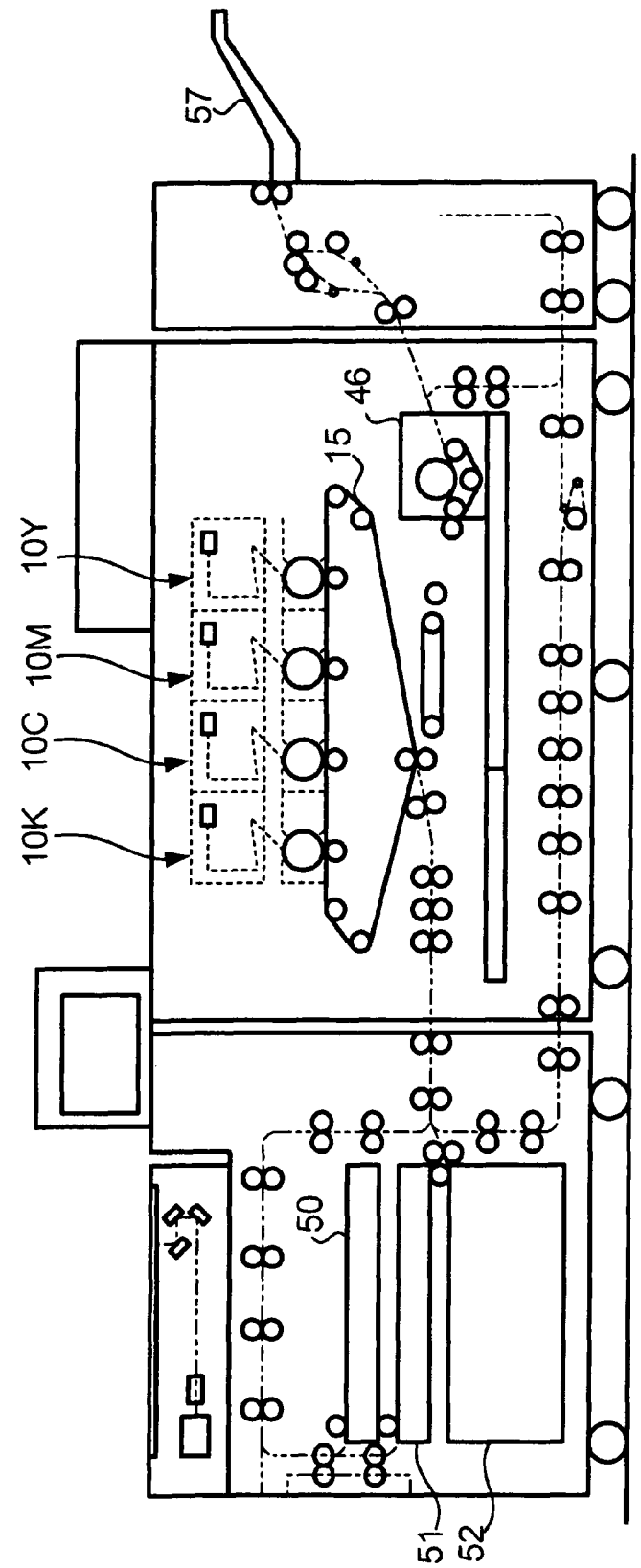
FIG. 2 is a sectional view showing a structure of an image forming unit.

FIG. 2 is a sectional view showing a structure of the image forming unit 110. The image forming unit 110 has image forming engines 10C, 10M, 10Y, and 10K for C (cyan), M (magenta), Y (yellow), and K (black), respectively. These image forming engines 10C, 10M, 10Y, and 10K each include: a photosensitive drum as an image carrier member which carries an image; an electrostatic charge device which electrostatically charges the photosensitive drum to an electrostatic potential; an exposure device which irradiates the photosensitive drum with light corresponding to image data for a related toner color, to form an electrostatic latent image; and a developing device which develops the electrostatic latent image by supplying toner of a related toner color to the electrostatic latent image, to form a toner image on the surface of the photosensitive drum. Toner images formed by the image forming engines 10C, 10M, 10Y, and 10K are transferred (by primary transfer) to an intermediate transfer belt 15 which is suspended over plural rollers so as to rotate the rollers. Further, the toner images are transferred (by secondary transfer) to a recording material that is provided, as required, from any of container trays 50, 51, and 52. A fixing device 46 is provided in the downstream side along the conveying direction of the recording material, relative to the positions of the image forming engines 10C, 10M, 10Y, and 10K. The fixing device 46 fixes the toner images to the surface of the recording material by heating and pressing the recording material onto which the toner images have been transferred. Then, the recording material which has passed through the fixing process is ejected onto a recording material output tray 57.

The dislocation detection unit 106 shown in FIG. 1 is capable of reading any of the toner images formed on the photosensitive drums, the intermediate transfer belt 15, and the recording material, and detects positional dislocation of pixels forming the read image, in the main and sub scanning directions. Such positional dislocation of pixels is caused by replacing of a replaceable member such as a photosensitive drum for each color in the image forming unit 110, a developing device for each color, or an intermediate transfer belt. Alternatively, the positional dislocation is caused by a change in the position, temperature, or humidity relative to the image forming unit 110. For example, in a case of reading a toner image formed on the intermediate transfer belt 15, the dislocation detection unit 106 detects positional dislocation of pixels on a recording material on the basis of the position of an image sensed by an optical sensor. The dislocation detection unit 106 has the optical sensor provided near an outer circumferential face of the intermediate transfer belt in the image forming unit 110. More specifically, the image forming unit 110 forms pattern images at two or more different positions in the main scanning direction of the outer circumferential face of the intermediate transfer belt. The dislocation detection unit 106 reads these pattern images to determine an amount of positional dislocation of pixels in the main and sub scanning directions.

The correction value calculation unit 107 obtains a correction approximate function on the basis of the dislocation amounts detected by the dislocation detection unit 106, and determines correction values for correcting an image width. That is, the correction value calculation unit 107 determines a number of pixels to be inserted into or reduced from an image. For example, when correcting a width of an image in the main scanning direction, a correction value as described above indicates the number of pixels to be inserted or reduced from each main scanning line extending along the main scanning direction. Otherwise, when correcting a width of an image in the subscanning direction, the correction value indicates the number of pixels to be inserted or reduced from each subscanning line extending in the subscanning direction.

The correction unit 104 performs correction processing of inserting or reducing pixels from each main or sub scanning line, in accordance with a correction value as described above. This correction processing corrects widths of images formed on a recording sheet. The correction unit 104 has a random number generator which generates a random number. The correction unit 104 determines a target position into or from which pixels are inserted or reduced, based on a correction method and a parameter prestored in the memory 108.

The bit map data after correction is outputted to the image forming unit 110 via an image data output unit from the correction unit 104. Based on the bitmap data, the image forming unit 110 forms an image on a recording sheet through a process as described above. As is also described above, processing for correcting positional dislocation of pixels is effected on the bit map data itself, which is supplied to the image forming unit 110. Therefore, images formed on the photosensitive members for respective colors in the image forming unit 110 have pixels which have already been subjected to correction of positional dislocation.

The display unit 111 displays a variety of information and operation screens. The operation unit 112 receives various operations conducted by a user, and supplies the system control unit 109 with signals corresponding to the corrections. The system control unit 109 performs display control of the display unit 111, and also performs processing according to the signals from the operation unit 112. Further, the system control unit 109 controls overall operation of the entire image processing apparatus 100.

A basic method for correcting an image width will now be described in more detail.

For example, if a width of an image in the main scanning direction is shorter by three pixels than an ideal width, the correction unit 104 needs only to magnify the bit map data of the image by three pixels in the main scanning direction. More specifically, the correction unit 104 extracts three pixels from each main scanning line, and inserts, next to the extracted pixels, pixels having the same density as the extracted pixels. Hereinafter, the pixels extracted in this manner will be referred to as "correction pixels" and the inserted pixels will be referred to as "inserted matter." In a case of reducing pixels, correction pixels are exactly identical to the pixels actually reduced because pixels extracted from each main scanning line are reduced.

Figure 3:
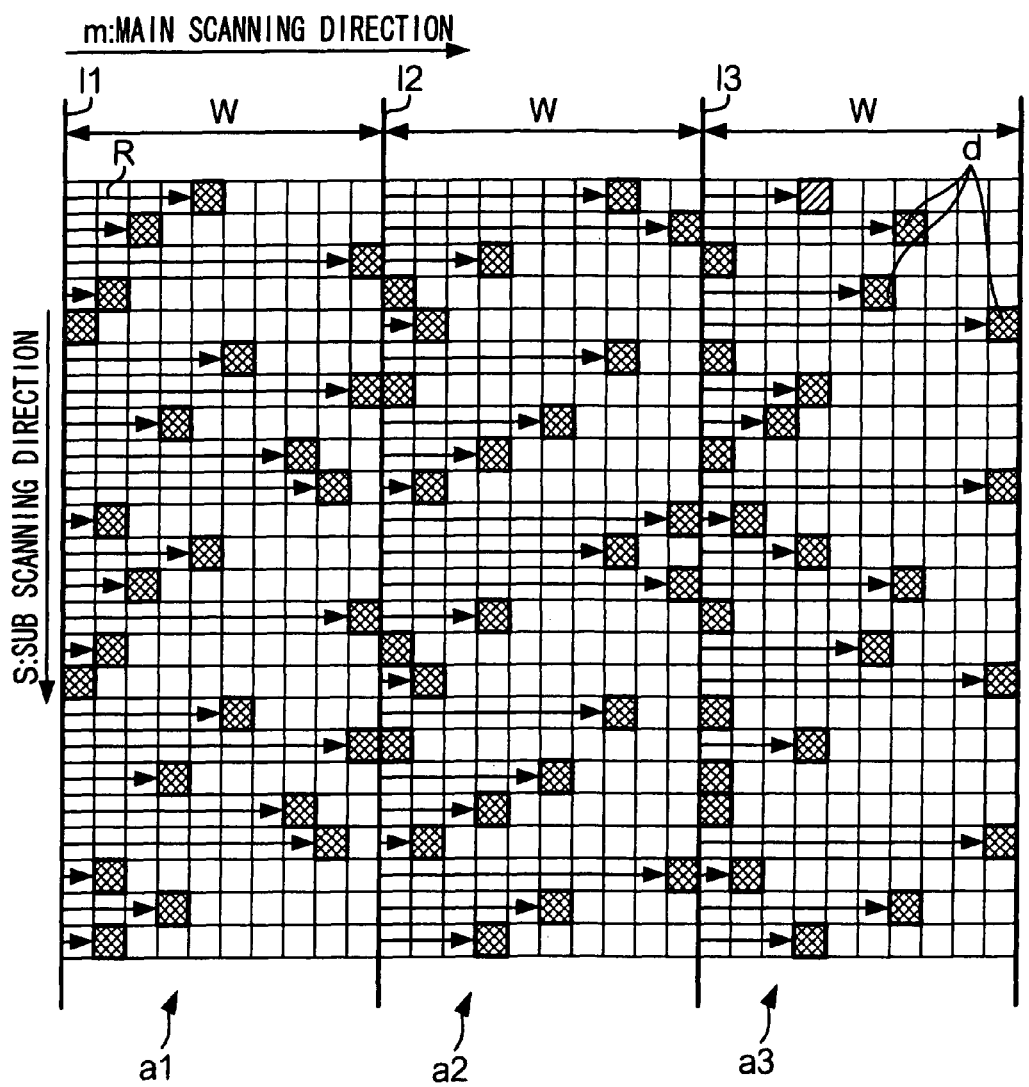
FIG. 3 shows an example of positions of pixels for correcting an image width.

If correction pixels are positioned with regularity to form a layout pattern over the main scanning lines, e.g., if correction pixels are arranged along a certain line, a linearly defective image appears. Hence, as shown in FIG. 3, a method can be suggested to decide positions of correction pixels, depending on random numbers. That is, the entire image is divided by the same number as the number of correction pixels in the main scanning direction. In each of divided image areas, correction pixels are positioned by random distribution on the basis of random numbers. In the following, this method will be described with reference to an example in which an entire image is divided into three image areas. Here, "dividing an image in (or along) the main scanning direction" refers to division of an image by boundaries where certain positions along the main scanning direction are taken as the boundaries. Further, image areas a1, a2, and a3 shown in FIG. 3 are referred to as "partial image areas a1, a2, and a3". Where it is not necessary to distinguish the "partial image areas a1, a2, and a3", the image areas a1, a2, and a3 each will be referred to as a "partial image area a".

Figure 4:
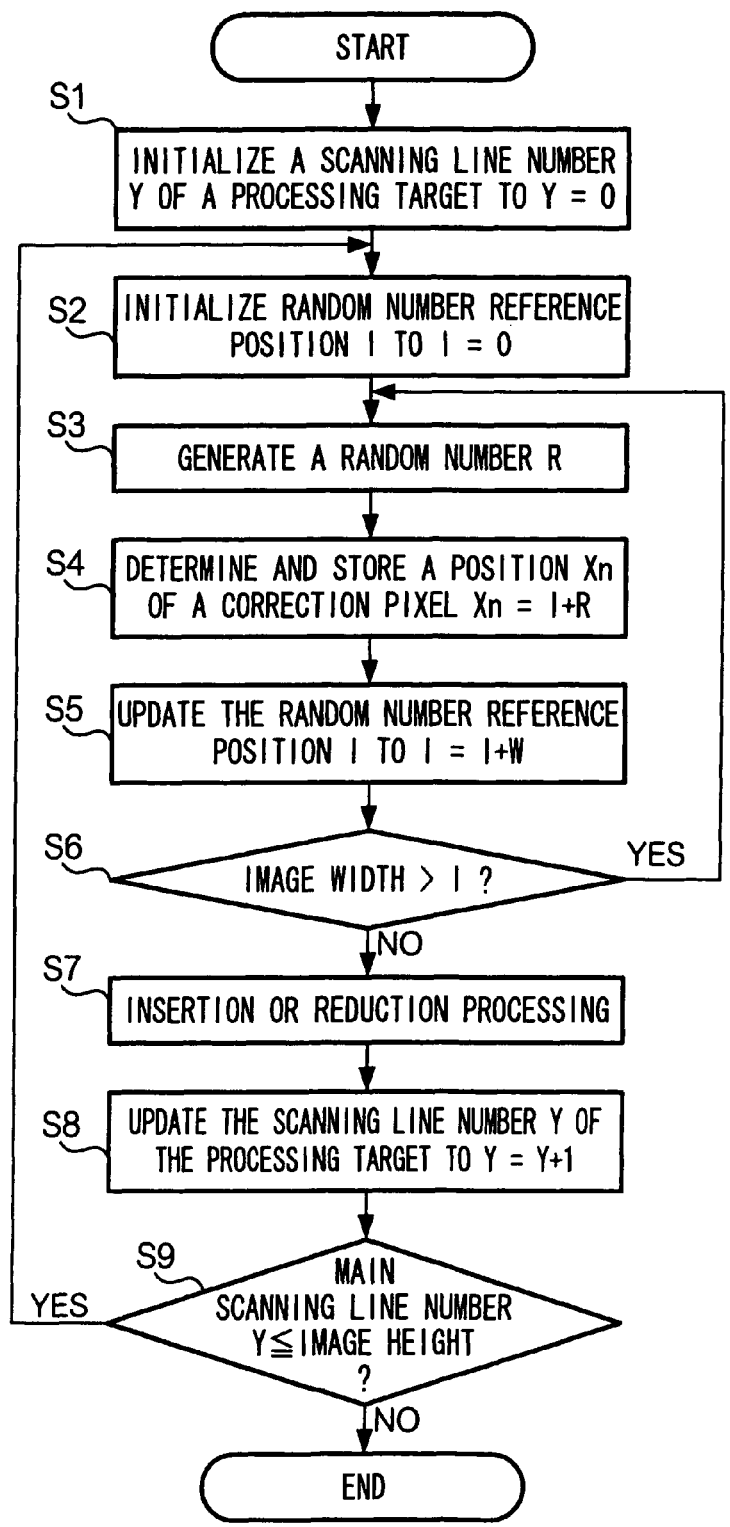
FIG. 4 is a flowchart showing a processing flow for correcting an image width.

In this correction method, as shown in the flowchart of FIG. 4, the correction unit 104 initializes a main scanning line number Y to Y=0 where the number Y indicates a main scanning line as a target to be subjected to correction processing (S1). The main scanning line number Y is assigned in ascending order from the main scanning line at the top of an image, such as from an upper end of an image, and is an integer within a range expressed by 0<=Y<="height of an image".

Next, the correction unit 104 initializes a random number reference position 1 to 1=0 (S2). The random number reference position "1" indicates a position of a sub scanning line as a reference from which counting of random numbers starts. For example, the random number reference position "1" is assigned in ascending order from the subscanning line at the top of an image, such as a sub scanning line at the left side of an image. This random number reference position 1 is an integer within a range of "0"<=1<="width of an image". 1=0 corresponds to 11 in FIG. 3.

Next, the correction unit 104 generates a random number R which is an integer ranging from "0" to "(the number of pixels equivalent to a length W)–1" (S3). The length "W" is the length of the partial imaging area a in the main scanning direction. The number of pixels equivalent to the "length W" is equivalent to a value obtained by dividing the number of pixels equivalent to an image width by the number of correction pixels d. Further, the correction unit 104 adds the random number reference position "1" and the random number R, to decide a position Xn of a correction pixel d (S4). The position Xn means a position which is forward by a number of pixels equivalent to the random number R in the main scanning direction toward the main scanning direction from the random number reference position 1. For example, if the main scanning line number Y=0, the random number reference position 1=0, and the random number R=5 are given, the position Xn of a correction pixel d is the fifth pixel from the left end of the main scanning line at the upper end of the image, as shown in FIG. 3. In this manner, the position of the correction pixel d on the main scanning line assigned to the main scanning line number Y=0 in the partial imaging area al is specified.

Next, the correction unit 104 adds the number of pixels equivalent to the length W of the partial image area a in the main scanning direction to the random number reference position 1, to update the random number reference position 1 (S5). In this manner, the random number reference position 11 is updated to the random number reference position 12 in FIG. 3. Subsequently, the correction unit 104 confirms that the updated random number reference position 1 falls within the range of the image width (S6: Yes), and thereafter returns to processing in the step S3. The correction unit 104 then repeats the processing from the step S3 to step S5. As a result, the position Xn of a correction pixel d on the main scanning line assigned to the main scanning line number Y=0 in the partial image area a2 is specified. Further, the correction unit 104 returns to the processing from the step S3 after making a determination in the step S6, and performs the processing from the step S3 to step S5. In this manner, the position Xn of a correction pixel d on the main scanning line assigned to the main scanning line number Y=0 in the partial image area a3 is specified.

As the processing from the step S3 to step S6 is repeated three times as described above, positions Xn of correction pixels on the main scanning lines assigned to the main scanning line number Y=0 in the partial image areas a1, a2, and a3 are specified. Next, the correction unit 104 performs correction processing by inserting or reducing pixels at positions of correction pixels d existing at the specific positions (S7). For example, in case of inserting a pixel in order to magnify an image width, the correction unit 104 inserts an insertion pixel at a position which is one-pixel forward from the position Xn of a correction pixel d in the main scanning direction m.

Next, the correction unit 104 adds "1" to the main scanning line number Y, to update the main scanning line number Y (S8). Further, the correction unit 104 confirms that the updated main scanning line number Y falls within a range of main scanning line numbers equivalent to the height of the image (S9: Yes), and thereafter returns to processing in the step S2. The correction unit 104 repeats the processing from the step S2 to step S8 again. In this manner, positions Xn of correction pixels d on the main scanning line assigned to the main scanning line number Y=1 in the partial image areas a1, a2, and a3 are specified. Correction processing is then carried out with respect to the correction pixels d.

The above processing from the step S2 to step S8 is repeated a number of times corresponding to values of main scanning line numbers equivalent to the height of the image. Further, if the updated main scanning line number Y is determined in a step S9 to have exceeded the main scanning line number corresponds to the height of the image (S9; No), the processing in the correction unit 104 ends. The above processing method of taking as a correction pixel d a pixel positioned forward by a number equal to a random number R in the main scanning direction from the random number reference position 1 is adopted in common in methods (A, B, C, and D) described later which are particular to this exemplary embodiment.

Figure 5:
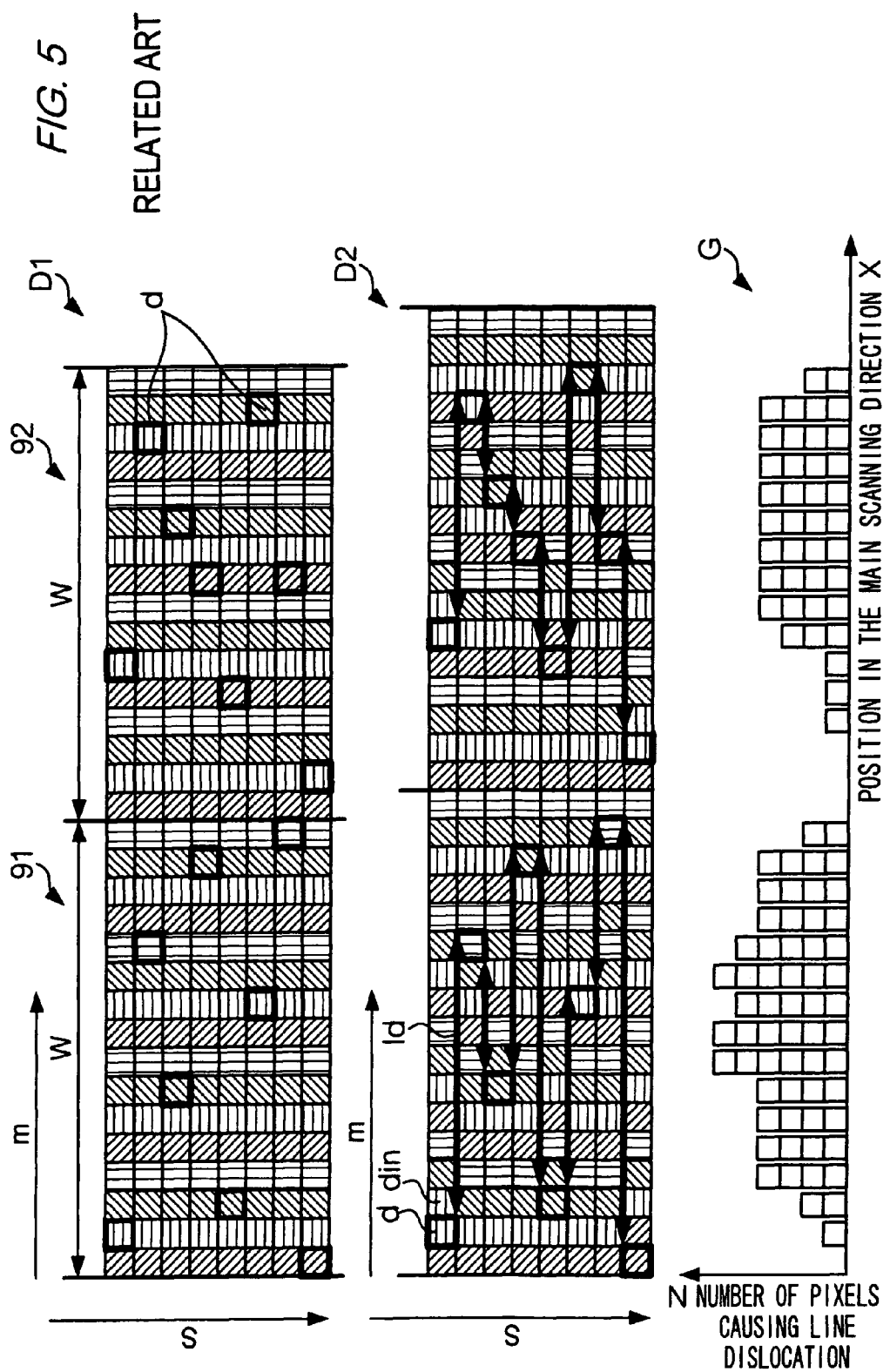
FIG. 5 illustrates why line dislocation is caused by correcting an image width.

FIG. 5 shows states where one pixel is inserted on each main scanning line in each of the partial image areas a1 and a2 shown in FIG. 3. In an image D1, positions of the correction pixels d are determined by random numbers in an image D1, and insertion pixels din are respectively inserted next to the correction pixels. Then, pixels are arranged in a layout shown in an image D2. Also in the image D1, the pattern filled in each rectangle indicating a pixel is varied for each sub scanning line. This is to clearly show how pixel positions in the image D1 are shifted by insertion of the pixels din to pixel positions in the image D2. As can be seen from the layout of pixels in the image D2, insertion pixels din are respectively inserted right next to the correction pixels d, so that all the pixels on the right sides of the correction pixels d in the partial image areas a1 and a2 are shifted rightwards by a distance equivalent to one pixel.

A graph G in FIG. 5 shows values each expressing, for each sub scanning line, a number of pixels which are shifted to a different sub scanning line in the image D2 from original pixel positions next to correction pixels in the image D1 among pixels existing on the same sub scanning line. For example, in the uppermost main scanning line in the image D2, the second pixel from the left is a correction pixel d, and the third pixel from the left is an insertion pixel din. Due to inserting of the insertion pixels din, all the pixels that are on the right side of the correction pixels d in the image D1 shift rightwards by one pixel. Further, in the second main scanning line from the top in the image D2, the twelfth pixel from the left is a correction pixel d, and the thirteenth pixel from the left is an insertion pixel din. On this main scanning line as well, if an insertion pixel din is inserted as described above, all the pixels on the right side of the correction pixel d are shifted rightwards by one pixel.

Further, the row of pixels on the uppermost main scanning line in the image D2 is compared with the row of pixels on the second main scanning line from the top in the image D2. From the comparison, a pixel group denoted by an arrow Id in the second line from the top in the image D2 is shifted relatively to a pixel group in the uppermost main scanning line. In the example of FIG. 5, the pixel group corresponds to the third to tenth pixels from the left. Thus, positions of correction pixels differ between an n-th main scanning line from a main scanning line formed first as a part of image information and an (n+1)-th main scanning line. Therefore, pixels arranged on the same sub scanning line in the image D1 are located on different sub scanning lines in the image D2. As a result, pixels arranged in line in the image D1 are dislocated in the main scanning direction in the image D2. Shifting of pixel positions as described above will be hereinafter called "line dislocation".

In the graph G, one pixel is counted for each of the third to tenth pixels from the left. If such processing is carried out for every main scanning line, a bar graph similar to the graph G is obtained. As can be seen from this graph, the number N of pixels resulting in line dislocation is maximized at a center part in each of the partial image areas a1 and a2, i.e., at a position corresponding to an average value of random numbers. The number N of the pixels resulting in line dislocation decreases gradually from the center part toward a boundary part in each partial image area a1 and a2. At each boundary part, the number N becomes "0". Thus, in the image D2, a deviation occurs in positions of the pixels causing line dislocation.

Next, the methods A, B, and C of used in this exemplary embodiment will be described.

Method A: Without changing the range of values available as random numbers mentioned above, each partial image area a is divided for each of plural main scanning lines, and divided image areas are offset in the main scanning direction.

Method B: A maximum value available as a random number mentioned above is set greater than the number of pixels equivalent to the length W.

Method C: A maximum value available as a random number mentioned above is set smaller than "(the number of pixels equivalent to the length W)−1". In addition, each partial image area a is divided for each of plural main scanning lines, and divided image areas are offset in the main scanning direction.

The term "offset" means shifting of divided image areas on an image. W is the length of each divided image area in the main scanning direction.

First, the content of the method A will be described with reference to FIGS. 6 to 8.

Figure 6:
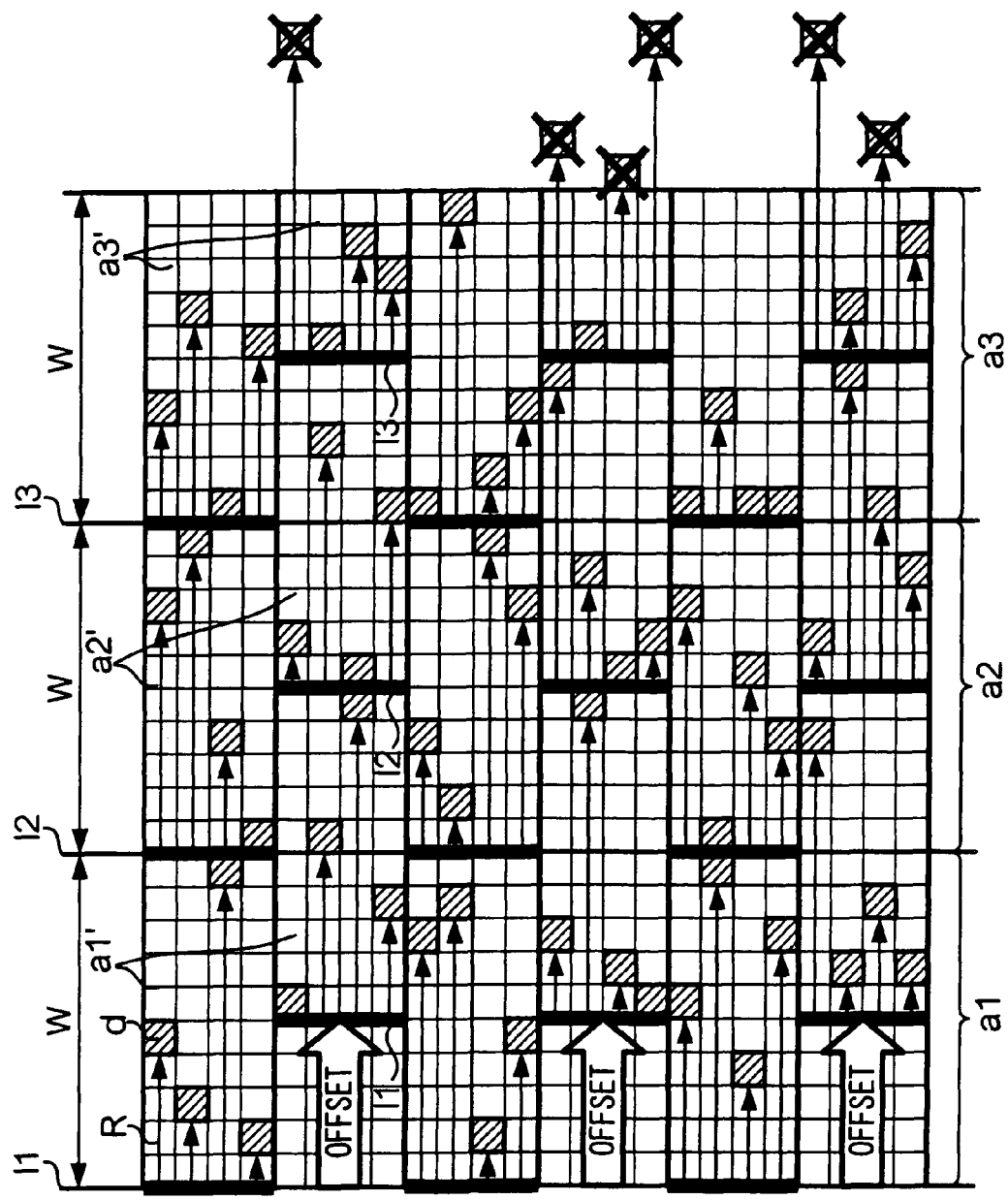
FIG. 6 illustrates a method A of the exemplary embodiment.

In the method A, the correction unit 104 divides the partial image areas a1, a2, and a3 shown in FIG. 3 for each of plural main scanning lines in the subscanning direction, as shown in FIG. 6. FIG. 6 shows an example of dividing each partial image area for every four main scanning lines. In the following, these divided image areas a1', a2', and a3' each are referred to as a "correction unit image area".

The correction unit 104 determines positions of correction pixels d by random numbers in each of these correction unit image area a1', a2', and a3'. Further, the correction unit 104 offsets, by a predetermined distance from the left side of the entire image, even-numbered correction unit image areas a1', a2', and a3' counted from the top of the figure. This state is substantially equal to a state where the random number reference positions 11, 12, and 13 are defined in units each including a predetermined number of main scanning lines, and are offset in the main scanning direction. At this time, positions of correction pixels d overflow from the right side of the entire image, in the right sides of the even-numbered correction unit image areas a1', a2', and a3' from the top. In FIG. 6, pixels checked with X marks denote the overflowing pixels. In this case, the correction unit 104 is configured so as to carry out the processing while ensuring a memory capacity large enough to store an area larger than the entire area of the image.

A flow of concrete processing in the correction unit 104 according to the method A will be as follows. In the following description, the main scanning line number Y, random number reference position 1, random number R, and length W follow the same concept as described with reference to FIG. 4.

Figure 7:
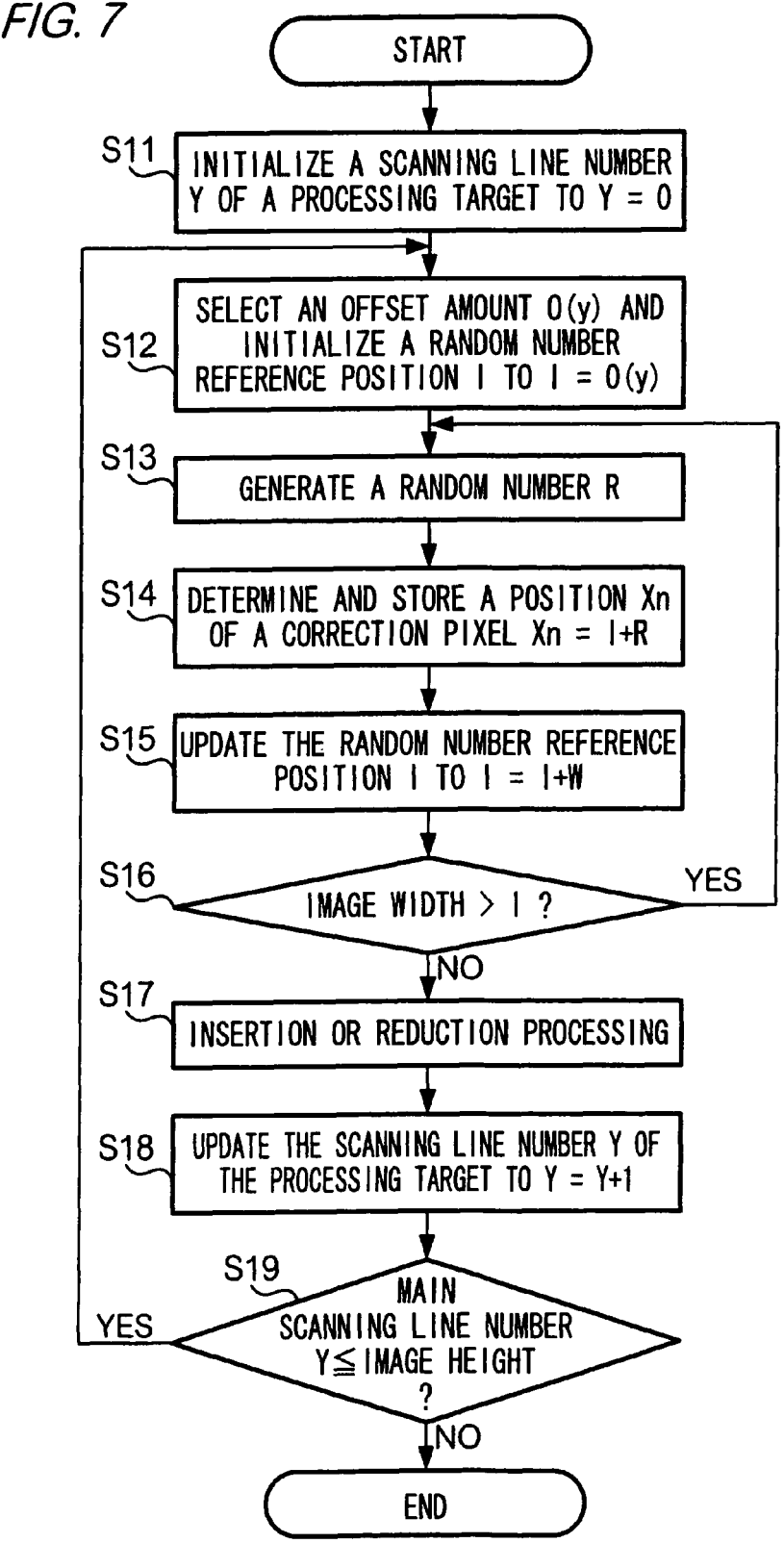
FIG. 7 is a flowchart showing a processing flow for correcting an image width according to the method A.

As shown in the flowchart of FIG. 7, the correction unit 104 initializes first the main scanning line number Y to Y=0 where the number Y indicates a main scanning line as a target to be subjected to correction processing (S1). Next, the correction unit 104 selects an offset value O(y) for the main scanning line number Y, and initializes the random number reference position 1 to the offset value O(y), i.e., 1=O(y) (S12). This offset value O(y) is an amount by which correction unit image areas are offset. For example, in case of FIG. 6, none of the correction unit image areas a1', a2', and a3' at the top end of the image is offset. Therefore, all the offset values O(y) for the main scanning line numbers Y=0, 1, 2, and 3 corresponding to each of the correction unit image area are "0". In contrast, the second correction unit image areas a1', a2', and a3' from the top of the image are offset by five pixels in the main scanning direction m. Therefore, all the offset values O(y) for the correction unit image areas corresponding to the main scanning line numbers Y=4, 5, 6, and 7 are "5". Also, the offset value O(y)=5 in FIG. 6 is equivalent to (the number of pixels equivalent to the length W)/2.

Further, the correction unit 104 generates a random number R which is an integer ranging from "0" to "(the number of pixels equivalent to the length W)−1" (S13). Next, the correction unit 104 adds up the random number reference position "1" and the random number R, to decide a position Xn of a correction pixel d (S14).

Next, the correction unit 104 adds a number of pixels equivalent to the length W of the partial image area a in the main scanning direction to the random number reference position 1, to update the random number reference position 1 (S15). Further, the correction unit 104 confirms that the updated random number reference position 1 falls within the range of the image width (S16: Yes), and then returns to processing in the step S13. The correction unit 104 repeats the processing from the step S13 to step S15 again. As a result, the position Xn of a correction pixel d on the main scanning line assigned to the main scanning line number Y=0 in the correction unit image area a2' is specified. Further, the correction unit 104 returns to the processing from the step S13 after making a determination in the step S16, and performs the processing from the step S13 to step S15. In this manner, the position Xn of a correction pixel d on the main scanning line assigned to the main scanning line number Y=0 in the correction unit image area a3' is specified.

As the processing from the step S13 to step S16 is repeated three times as described above, positions Xn of correction pixels on the main scanning lines assigned to the main scanning line number Y=0 in the correction unit image areas a1', a2', and a3' are specified. Next, the correction unit 104 performs correction processing by inserting or reducing pixels at the specified positions of correction pixels d (S17).

Thereafter, the correction unit 104 adds "1" to the main scanning line number Y, to update the main scanning line number Y (S18). Further, the correction unit 104 confirms that the updated main scanning line number Y falls within a range of main scanning line numbers equivalent to the height of the image (S19: Yes), and thereafter returns to the processing in the step S12. The correction unit 104 then repeats the processing from the step S12 to step S18. In this manner, positions Xn of correction pixels d on the main scanning line assigned to the main scanning line number Y=1 in the correction unit image areas a1, a2, and a3 are specified. Correction processing is then carried out with respect to the correction pixels d.

The above processing from the step S12 to step S18 is repeated a number of times, the number of times corresponding to values of main scanning line numbers equivalent to the height of the image. Further, if the updated main scanning line number Y is determined in the step S19 to have exceeded the main scanning line number corresponding to the height of the image (S19; No), the processing by the correction unit 104 ends.

Figure 8:
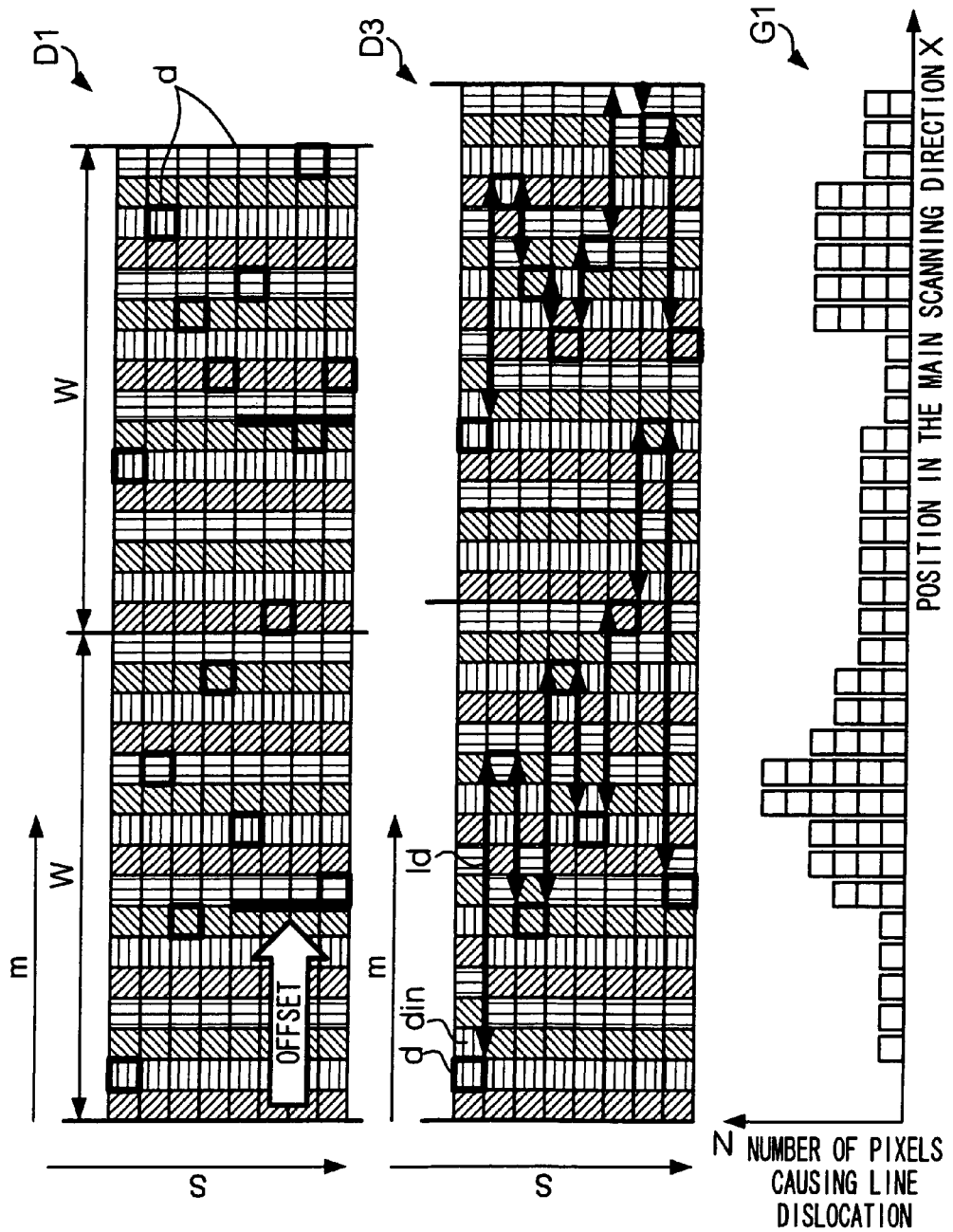
FIG. 8 illustrates why line dislocation is relaxed according to the method A.

If positions of correction pixels d are defined according to this method A, the pixel layout shown in the image D1 transits to the pixel layout shown in the image D2, as shown in FIG. 8. Compared with the graph G shown in FIG. 5, the number of pixels resulting in line dislocation is more evenly dispersed throughout the entire areas in the main scanning direction in the graph G1 in FIG. 8. This is achieved for the following reasons.

Where the correction unit image areas a1', a2', and a3' as shown in FIG. 6 are viewed along the sub scanning direction, odd-numbered correction unit image areas a1', a2', and a3' from the top partially overlap the even-numbered correction unit image areas a1', a2', and a3' from the top, respectively. That is, there is a relationship of partial overlap between projected areas of the odd-numbered correction unit image areas a1', a2', and a3' from the top and projected areas of the even-numbered correction unit image areas a1', a2', and a3' from the top, respectively, where the correction unit image areas a1, a2, and a3 are projected in the subscanning direction.

Figure 9:
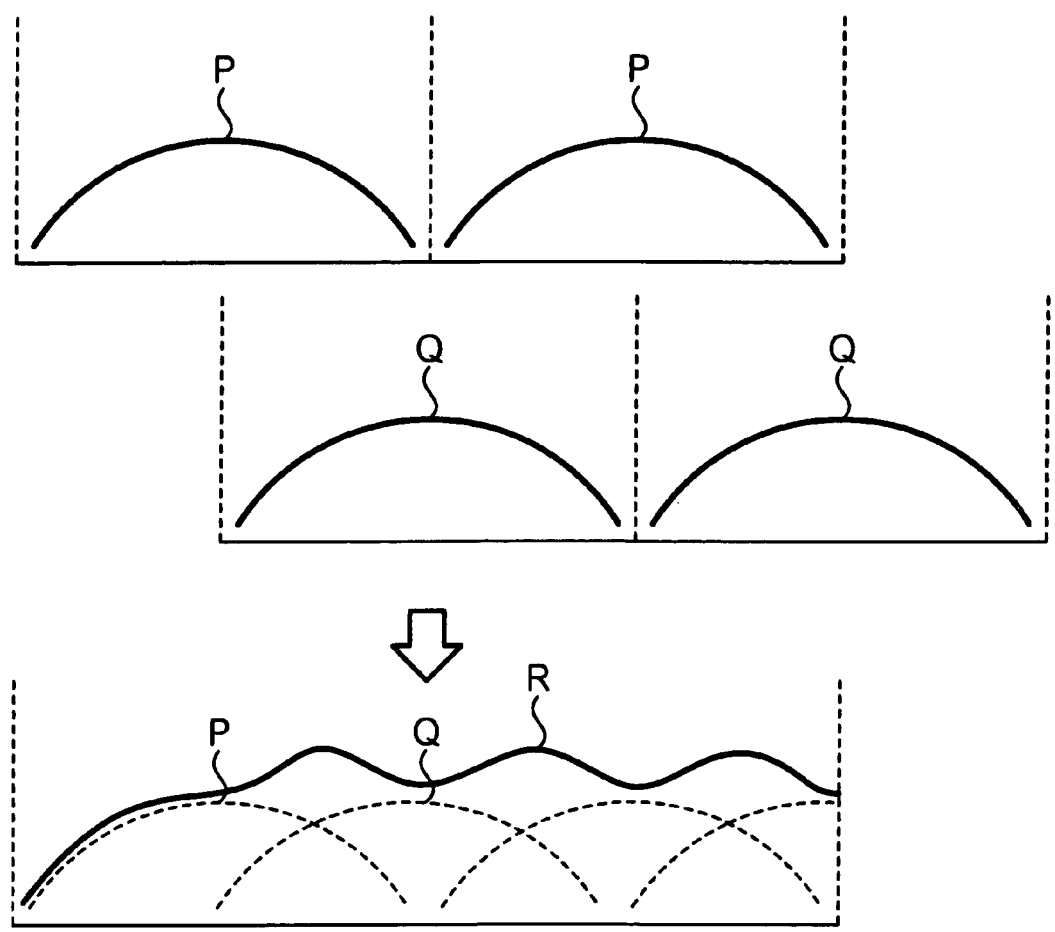
FIG. 9 graphically show why line dislocation is relaxed according to the method A.

Hence, as is schematically shown in FIG. 9, a deviation P of pixels causing line dislocation in the odd-numbered correction unit image areas a1', a2', and a3' from the top and a deviation Q of pixels causing line dislocation in the even-numbered correction unit image areas a1', a2', and a3' from the top are added. As a result, the deviations complement each other, so that the pixels causing line dislocation are distributed as indicated by a curve R.

In FIG. 6, two types of offset values "0" and "(the number of pixels equivalent to the length W)/2" are used as offset amounts for the correction unit image areas a1', a2', and a3'. However, three or more types of offset values can be used instead of the two types of offset values. However, a difference greater than "(the number of pixels equivalent to the length W)/3" is desirably maintained between an offset value for n-th correction unit image areas a1', a2', and a3' from the top and an offset value of the (n+1)-th correction unit image areas a1', a2', and a3' from the top. That is, where the correction unit image areas a1', a2', and a3' are projected in the subscanning direction, an overlapping part between projected areas of contiguous correction unit image areas is ⅓ or more of one correction unit image area.

The method B will be now described.

Figure 10:
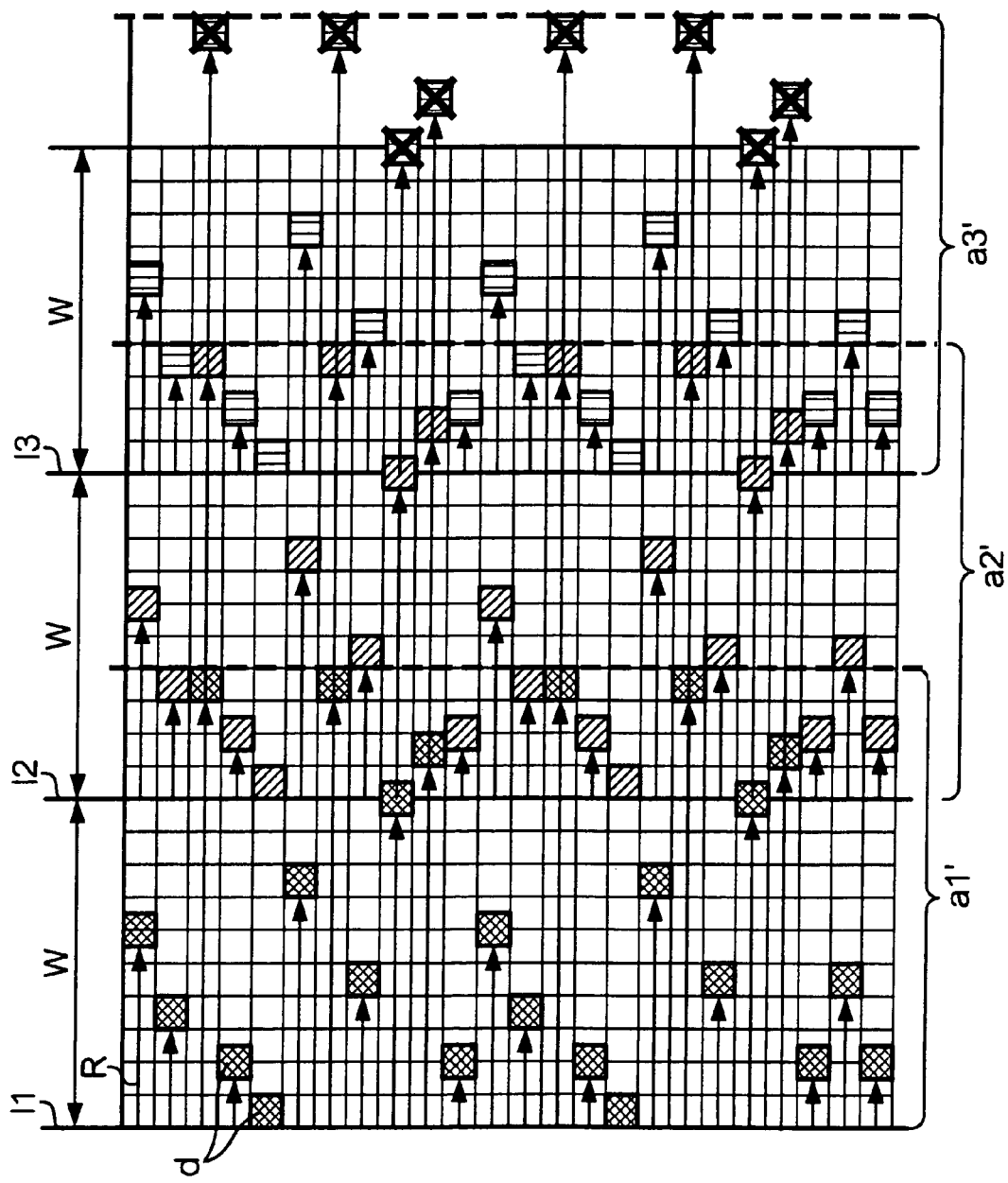
FIG. 10 illustrates a method B of the exemplary embodiment.

In the method B, the correction unit 104 does not change the positions of the random number reference positions 11, 12, and 13 mentioned above but sets values available as random numbers to be greater than the number of pixels equivalent to the length W. In this manner, every two contiguous correction unit image areas a1', a2', and a3' partially overlap each other, as shown in FIG. 10. That is, where the correction unit image areas a1', a2', and a3' are projected in the subscanning direction, projected areas of every two contiguous correction unit image areas partially overlap each other. Referring to the correction unit image area a1' related to the random number reference position 11, for example, correction pixels d are defined over the correction unit image area a1' and at least a part of the correction unit image area a2' contiguous to the area a1'. Referring to the correction unit image area a2' related to the random number reference position 12, for example, correction pixels d can be defined within an area constituted of the correction unit image area a2' and at least a part of the correction unit image area a3' contiguous to the area a2'.

In the method B, however, it should be noted that positions of the correction pixels d in a correction unit image area have to be at the left side of positions of correction pixels d in another correction unit image area right next to the former correction unit image area That is, positional relationship between correction pixels in the main scanning direction in the correction unit image areas may not be reversed, but need to have a positional relationship that complies with the positional relationship between correction unit image areas in the main scanning direction.

Methods described below can be adopted to maintain such relationships.

A first method will now be described. If a position of a correction pixel d determined by a random number in the correction unit image area a1' is in the right side of a correction pixel d determined by a random number in the correction unit image area a2' right next to the area a1', as described above, the correction unit 104 determines a pixel next to the correction pixel d in the correction unit image area a1' to be a correction pixel d in the correction unit image area a2'. That is, if positional relationship between the correction pixels d is the reverse of positional relationship between the correction unit image areas a1', a2', and a3', the correction unit 104 corrects the positions of the correction pixels d so as to comply with the positional relationship between the correction unit image areas.

Next, in a second method, the correction unit 104 generates one random number for each main scanning line. The correction unit 104 determines positions of correction pixels d, using one equal random number for the correction unit image area a1', a2', and a3' on the same main scanning line. That is, the correction unit 104 carries out adjustment in advance so that the positional relationship between correction pixels d complies with the positional relationship between correction unit image areas a1', a2', and a3'.

In a third method, positions of correction pixels in the correction unit image areas a1', a2', and a3' are determined in advance and are stored as fixed values in the memory 108. In this case, positions of correction pixels d are determined so that the positions of the correction pixels d may not be changed even if the correction unit image areas a1', a2', and a3' overlap one another. That is, adjustment is carried out in advance so that the positional relationship between correction pixels in the main scanning direction in the correction unit image areas a1', a2', and a3 may not be reversed but should have a positional relationship that complies with the positional relationship between correction unit image areas a1', a2', and a3'. The correction unit 104 determines positions of correction pixels d using the fixed values.

Described next will be details of processing performed by the correction unit 104 in case of adopting the first method described above. In the following description, the main scanning line number Y, random number reference position 1, random number R, and length W follow the same concept as described with reference to FIG. 4.

Figure 11:
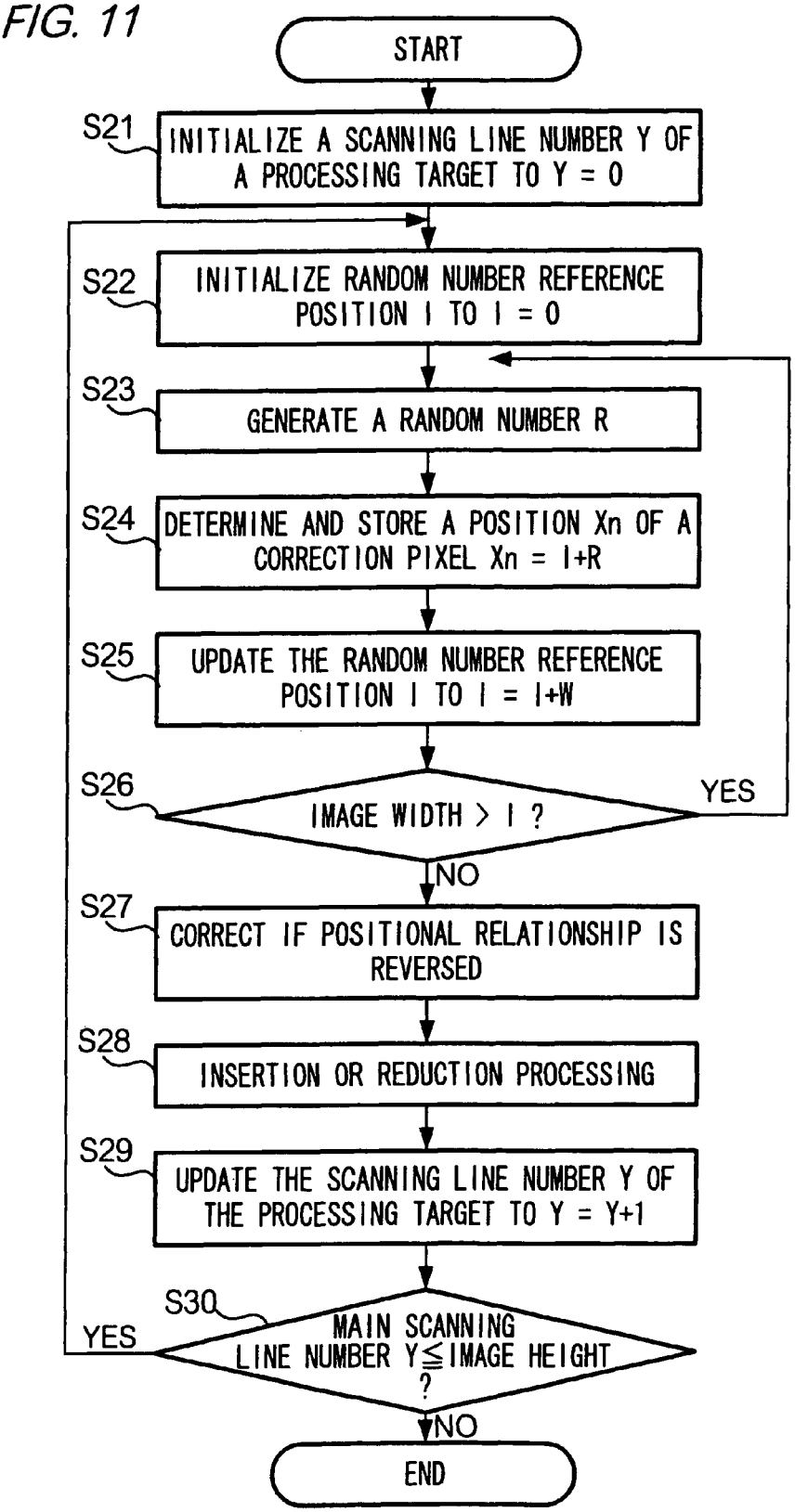
FIG. 11 is a flowchart showing a processing flow for correcting an image width according to the method B.

As shown in the flowchart of FIG. 11, the correction unit 104 initializes first the main scanning line number Y to Y=0 where the number Y indicates a main scanning line as a target to be subjected to correction processing (S21). Next, the correction unit 104 initializes the random number reference position 1 to 1=0 (S22). Next, the correction unit 104 generates a random number R which is an integer ranging from "0" to "(the number of pixels equivalent to the length W)+[]" (S23). This "[]" is a constant determined in advance in order that values available as random numbers R are greater than the number of pixels equivalent to the length W.

Next, the correction unit 104 adds the random number reference position "1" and the random number R, to decide a position Xn of a correction pixel d (S24). Next, the correction unit 104 adds the number of pixels equivalent to the length W of the partial image area a in the main scanning direction to the random number reference position 1, to update the random number reference position 1 (S25). Subsequently, the correction unit 104 confirms that the updated random number reference position 1 falls within the range of the image width (S26: Yes), and thereafter returns to processing in the step S23. The correction unit then 104 repeats the processing from the step S23 to step S25. As a result, the position Xn of a correction pixel d on the main scanning line assigned to the main scanning line number Y=0 in the correction unit image area a2' is specified. Further, the correction unit 104 returns to the processing of the step S23 after making determination in the step S26, and performs the processing from the step S13 to step S15. In this manner, the position Xn of a correction pixel d on the main scanning line assigned to the main scanning line number Y=0 in the correction unit image area a3' is specified.

As the processing from the step S23 to step S26 is repeated three times as described above, positions Xn of correction pixels on the main scanning lines assigned to the main scanning line number Y=0 in the correction unit image areas a1', a2', and a3' are specified. In this state, however, there is a possibility that positional relationship between correction pixels d is reversed as described above. Therefore, the correction unit 104 corrects positions of correction pixels d so that the relationship may not be reversed (S27). If the positional relationship between the correction pixels d is not reversed, this step S27 is skipped. Next, the correction unit 104 performs correction processing by inserting or reducing pixels at the correction pixels d (S28). The correction unit 104 further adds "1" to the main scanning line number Y, to update the main scanning line number Y (S29). Further, the correction unit 104 confirms that the updated main scanning line number Y falls within a range of main scanning line numbers equivalent to the height of the image (S30:Yes), and thereafter returns to the processing in the step S22. The correction unit 104 then repeats the processing of the step S22 to step S29. In this manner, positions Xn of correction pixels d on the main scanning line assigned to the main scanning line number Y=1 in the correction unit image areas a1, a2, and a3 are specified. Correction processing is then carried out with respect to the correction pixels d.

The above processing from the step S22 to step S28 is repeated a number of times, the number corresponding to values of main scanning line numbers equivalent to the height of the image. Further, if the updated main scanning line number Y is determined in the step S30 to have exceeded the main scanning line number corresponding to the height of the image (S30; No), the processing in the correction unit 104 ends.

The method C will be now described.

Figure 12:
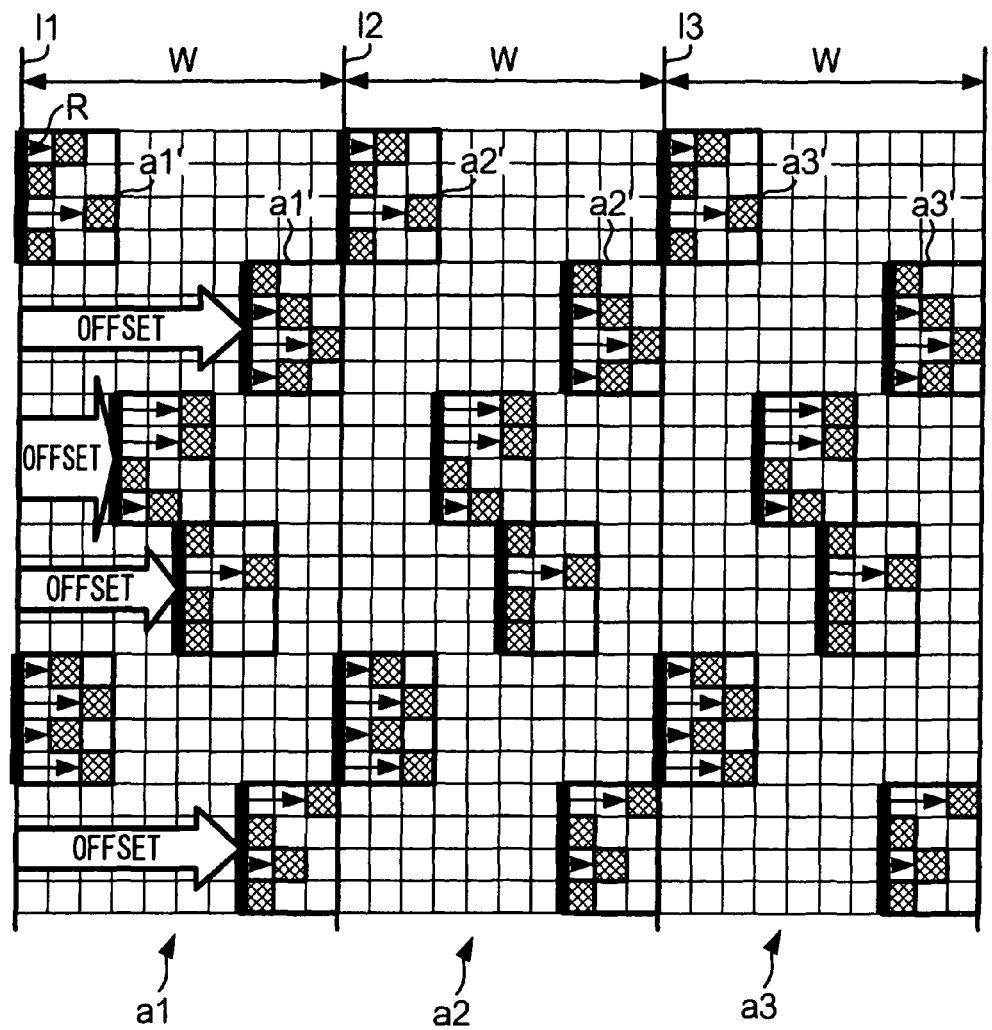
FIG. 12 illustrates a method C of the exemplary embodiment.

According to the method C, the correction unit 104 divides an image for each of plural main scanning lines and offsets each of divided correction unit image areas a1', a2', and a3' in the main scanning direction, as shown in FIG. 12. FIG. 12 shows an example of dividing each partial image area for every four main scanning lines. At this time, the offset value varies within a range from "0" to "[(the number of pixels equivalent to the length W)−1]−the length of the correction unit image areas a1', a2', or a3' in the main scanning direction)". This state is substantially equivalent to a state where the random number reference positions 11, 12, and 13 are determined in units each including a predetermined number of main scanning lines and are offset in the main scanning direction.

The random number which determines the position of a correction pixel in each of the correction unit image areas a1', a2', and a3' ranges from "0" to "(the length of the correction unit image areas a1', a2', or a3')−1". That is, each of the widths of the correction unit image areas a1', a2', and a3' in the sub scanning direction is smaller than the length of the entire image in the subscanning direction. Each of the widths of the correction unit image areas a1', a2', and a3' in the main scanning direction of is much smaller than a length obtained by dividing the entire image in the main scanning direction by the number of correction pixels on each main scanning line. The processing flow in the correction unit 104 according to the method C is substantially the same as the processing flow according to the method A shown in FIG. 7 except for differences in the range of values available as the random number R and the offset values of the random number reference position 1.

Figure 13:
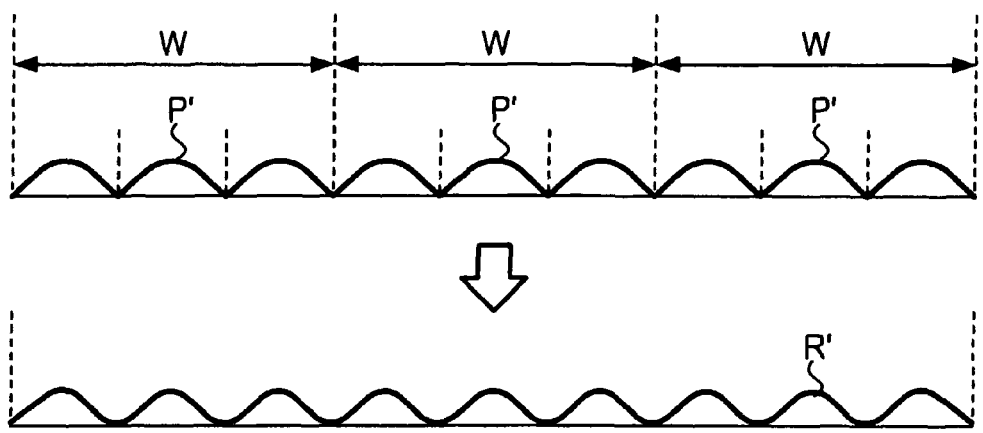
FIG. 13 graphically shows why line dislocation is relaxed according to the method A.

As shown in an upper part of FIG. 13, each of the lengths of correction unit image areas a1', a2', and a3' is shorter than the length W. Therefore, even if the number of pixels is causing line dislocation peaks at the center part of each correction unit image areas a1', a2', and a3, i.e., at a position corresponding to an average value of the random numbers, the absolute value of the peak is smaller than that shown in FIG. 5.

FIG. 13 exemplifies a case that correction unit image areas a1', a2', and a3' do not overlap one another where these areas each are projected in the sub scanning direction. However, if a random number is used as an offset value, projected areas of the correction unit image areas a1', a2', and a3 partially overlap one another where the correction unit image areas a1', a2', and a3' each are projected in the sub scanning direction.

The content of the method C has thus been described above.

The methods A and C can be considered to have common content as follows.

The correction unit 104 divides an image in the main scanning direction, and determines the number of correction pixels for each divided correction unit image area. Further, a random number reference position as a reference to determine a correction pixel in each of the correction unit divided image areas along the main scanning direction, is determined to be a position which varies along the subscanning direction perpendicular to the main scanning direction. Further, the correction unit 104 determines correction pixels in each correction unit image area, depending on the number of correction pixels, a random number, and the random number reference position. Furthermore, the image width is changed by carrying out of correction processing of insertion or reduction at the positions of the determined correction pixels.

On the other hand, the method B can be considered to have content as follows.

The correction unit 104 divides an image in the main scanning direction, and determines the number of correction pixels for each divided correction unit image area. Depending on the number of correction pixels, a random number, and a random number reference position, the correction unit 104 further determines correction pixels in a correction unit image area corresponding to the random number reference position for each correction unit image area and in a correction unit image area contiguous to the former correction unit image area. Furthermore, the image width is changed by carrying out correction processing of insertion or reduction at the positions of the determined correction pixels.

The phrase that the correction unit 104 "determines the number of correction pixels for each divided correction unit image area" implies a variety of cases as follows.

For example, in the description above, the number of correction pixels d on one main scanning line is equal to the number of divisions of the entire image. In this case, the number of correction pixels on each divided correction unit image area is always "1". Therefore, prestoring the numerical value "1" and applying this value to the number of correction pixels for each correction unit image area corresponds to the phrase that the correction unit 104 "determines the number of correction pixels for each divided correction unit image area".

In addition, if the number of correction pixels d in each correction unit image area a is set to, for example, two or more, the number of correction pixels d on one scanning line is not equal to the number of divisions of the entire image. In this case, the correction unit 104 obtains a value by dividing the number of correction pixels on the main or sub scanning line, which is calculated by the correction value calculation unit 107, by the number of the correction unit image areas (i.e., the number of divisions of the entire image). This also corresponds to the phrase that the correction unit 104 "determines the number of correction pixels for each divided correction unit image area".

Figure 14:
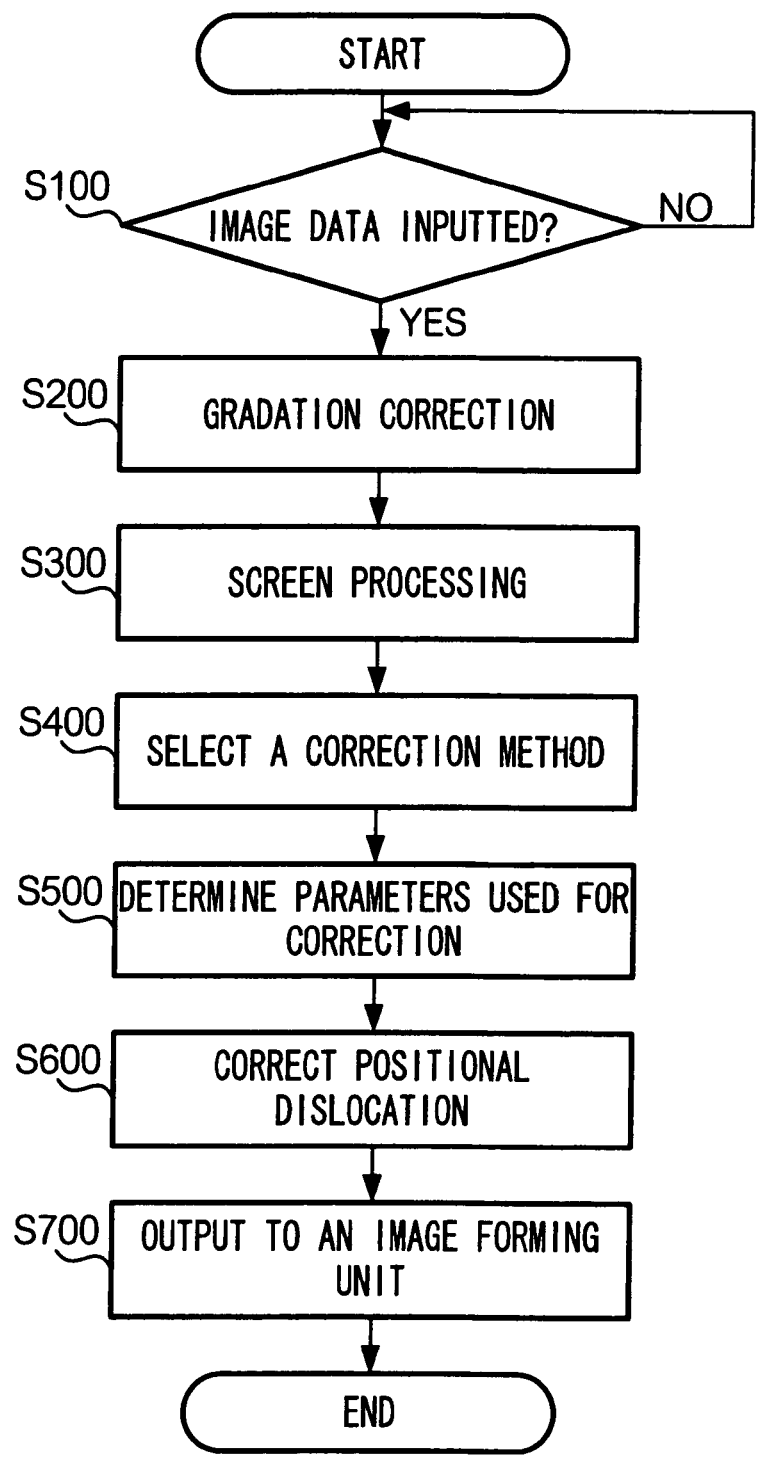
FIG. 14 is a flowchart showing operation of the exemplary embodiment.

Next, operation of the image processing apparatus 100 is described with reference to a flowchart shown in FIG. 14.

First, image data is inputted to the image data input unit 101 from an image data input device 200 (S100: Yes). The image data input unit 101 then converts the image data into image data in bitmap format (bitmap data) and supplies the obtained bitmap data to the gradation correction unit 102. The gradation correction unit 102 performs gradation correction, shading correction, and the like on the bitmap data, and supplies the corrected bitmap data to the screen processing unit 103 (S200). The screen processing unit 103 performs screen processing on the bitmap data subjected to gradation processing as described above, and then supplies the bitmap data to the correction unit 104 (S300). Next, the correction unit 104 selects any of the methods A to C described above on the basis of the number of correction pixels stored by the correction value calculation unit 107 (S400).

For example, if the number of correction pixels is smaller than a threshold, the correction unit 104 selects and uses the method C for correction processing. Otherwise, if the number of correction pixels is not smaller than the threshold, the correction unit 104 selects and uses the method A or B for correction processing. Compared with the method A or B, the method C limits the area where a correction pixel can exist, to a part of an image. On the other hand, for example, the area where a correction pixel can exist corresponds to an entire image, according to the method B. According to the method A, the area where a correction pixel can exist corresponds substantially to an entire image. The broader the area where a correction pixel can exist, the higher the extent to which content of an original image before correction is changed. Therefore, if the number of correction pixels is relatively small, content of an original image is desirably changed to as low an extent as possible by use of the method C. On the contrary, if the number of correction pixels is relatively great, content of an original image is changed to a high extent. Therefore, content of an original image is desirably changed to a high extent. For the reasons described above, the correction unit 104 adopts different correction methods between a case of a smaller number of correction pixels than the threshold and a case of a number of correction pixels not smaller than the threshold.

After selecting a correction method as described above, the correction unit 104 determines parameters to be used for performing correction processing, in accordance with the selected method (SS00). In the method A, for example, the parameters mentioned above are the offset value and length of each of the correction unit image areas a1', a2', and a3' in the sub scanning direction. In the method B, for example, the length of each of overlapping areas between contiguous correction unit image areas is such a parameter used. In the method C, for example, the parameters are offset values and the length of each of the correction unit image areas a1', a2', and a3' in the main and sub scanning direction.

These parameters can be determined in advance for each of the correction methods and stored in the memory 108. Alternatively, the parameters can be determined in accordance with a predetermined algorithm each time the correction unit 104 corrects positional dislocation of pixels. An algorithm which the correction unit 104 can use to determine the parameters is, for example, an algorithm which varies the offset value depending on the size of a correction unit width. More specifically, an offset value for a correction unit width greater than a threshold is decreased smaller than an offset value for a correction unit width not greater than the threshold. This is because a relatively great correction unit width means that a correction pixel can exist over a broad area, i.e., content of an original image is changed to a high extent. However, the extent to which content of an original image is changed should desirably not be as high as described previously. Therefore, the area where a correction pixel can exist is narrowed by decreasing of the offset value. That is, the extent to which content of an original image is changed is lowered.

Another algorithm which the correction unit 104 can use to determine the parameters is, for example, an algorithm which varies a layout pattern of correction pixels in the correction unit image areas depending on the number of pixels, as described previously according to the method B. More specifically, plural types of layout patterns of correction pixels in correction unit image areas are stored in advance in the memory 108. Further, the correction unit 104 selects a layout pattern corresponding to the number of correction pixels, and corrects positional dislocation of pixels by using the selected layout pattern.

If a correction method and parameters are selected/determined as described above, the correction unit 104 corrects positional dislocation of pixels with use of the determined parameters, in accordance with the determined correction method (S600). Further, the pixel correction unit 104 outputs bitmap data subjected to the correction processing via the image data output unit 105 (S700). The image forming unit 110 forms an image on a recording sheet through the process described above on the basis of the outputted data.

The exemplary embodiment described above can be modified as follows.

Correction pixels function to correct positional dislocation of pixels over an entire image and also function to change content of an original image. For example, in case of forming one single image on each of plural recording sheets, positions of correction pixels vary for each of the recording sheets if the random number and offset value are varied for each of the recording sheets. As a result of this, unevenness in density differs slightly between images formed in the individual recording sheets. It is therefore desirable to use the same random number and offset value for all of plural recording sheets. Specifically, the correction unit 104 determines a random number and an offset value in a stage of forming an image on the first one of plural recording sheets, and stores the random number and offset value into the memory 108. Further, when forming images on successive sheets, the correction unit 104 continuously uses the stored random number and offset value.

Meanwhile, there can be various methods for generating a random number.

For example, the above exemplary embodiment has been described with reference to a method of generating a random number ranging from "0" to "(the number of pixels equivalent to the length W)−1". However, the exemplary embodiment is not limited to such a method that generates a random number ranging from "0" to a "predetermined value". Although the exemplary embodiment suggests "0" as a minimum random number, the minimum random number can be set to "1". In this case, "1" can be added to the maximum random number described in the exemplary embodiment. There can be an alternative method in which, for example, a random number is generated within a range from "0" to a constant value "N" and the generated random number is multiplied by "(the length of the correction unit image area in the main scanning direction)−1". Another alternative method as follows can be considered in addition to foregoing methods which generate a random number by use of a random number generator incorporated in the correction unit 104. That is, a table in which irregular numerical values are written is stored in the memory 108. The correction unit 104 determines positions of correction pixels, using the numerical values in place of random numbers as described above. Compared with methods of generating a random number to determine a position of a correction pixel when determining a correction pixel, a method of determining a position of a correction pixel based on an irregularly predetermined numerical value can shorten the processing time desirably and effectively.

FIGS. 5 and 8 exemplify a case of inserting pixels. In case of reducing pixels, positions of correction pixels are determined using the same principles as in the case of inserting pixels, and pixels are reduced from the determined positions.

The above exemplary embodiment also exemplifies a case of correcting the length of an image in the main scanning direction. On the contrary, in a case of correcting the length of an image in the sub scanning direction, the "main scanning direction" and the "sub scanning direction" described in the exemplary embodiment can be replaced with each other. Since an electrophotographic image forming apparatus is adopted in the description of the above exemplary embodiment, the terms the "main scanning direction" as a first direction and the "sub scanning direction" as a second direction perpendicular to the first direction, are used. In an image processing apparatus and an image forming apparatus which do not perform scanning, the first direction is a direction in which an image width is changed by inserting pixels, and the second direction is a direction perpendicular to the first direction in which the image width is changed.

At least two of the three methods A, B, and C described above can be combined with each other.

Alternatively, a method described below which assumes the methods A, B, and C as prerequisites can be used. The method will hereinafter be referred to as a method D.

In the method D, positions of correction pixels d in the methods A, B, and C are predetermined to be irregular. Further, the length of each partial image area a in the main scanning direction is changed slightly. FIGS. 15 and 16 illustrate a case of incorporating the method D into a combination of the methods A and B, for example. FIG. 15 exemplifies positions of correction pixels in a correction unit image area. A layout pattern of such correction pixels as shown in the figure is stored in advance in the pattern memory 108. The correction unit 104 reads the layout pattern stored in the memory 108, specifies positions of correction pixels, using the layout pattern, and performs correction with respect to the pixels. However, if correction pixels with a predetermined layout pattern are used, the same patterns are continuously applied throughout an entire image area, so that a kind of regularity appears and acts as a factor causing a defective image. Hence, as shown in FIG. 16, the correction unit 104 slightly changes intervals between random number reference position 11, 12, and 13 while partially overlaying contiguous correction unit image areas on each other. Specifically, the correction unit 104 sets first the left side of an image as the random number reference position 11. Next, a position distant by a length W+a (where "a" is a distance equivalent to several pixels) from the left side of the image is set as the random number reference position 12. Further, a position distant by a length W−a from the random number reference position is set as the random number reference position 13. Thus, the correction unit 104 determines random number reference positions 11, 12, 13, . . . using the lengths W+a and W−a alternately. In this manner, line dislocation can be relaxed over the entire image.

The system to be employed in the image forming unit 110 is not particularly limited as long as the system functions to form an image based on image data in which positional dislocation of pixels has been corrected by image processing. A method for detecting positional dislocation of pixels can be as follows. The image forming unit 110 outputs a test pattern to outside of the image processing apparatus 100, and a dislocation amount determined through measurement by an external device can be inputted to the image processing apparatus 100. In this case, the dislocation detection unit 106 need not be provided in the image processing apparatus 100.

The image processing apparatus 100 shown in FIG. 1 can be constituted by a computer built in an image forming apparatus or by an image data input device such as a personal computer. Further, the processing procedures shown in FIGS. 7, 11, and 14 can be written in form of programs. The programs each can be recorded on a recording medium readable from a computer, such as a magnetic recording medium, optical recording medium, or ROM. In the form of such a recording medium, the program can be supplied for the image processing apparatus 100. Alternatively, the program can be downloaded to the image processing apparatus 100 via a network such as the internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an image segmentation unit that divides image information into image areas in a first direction;
    a random number memory that stores random numbers;
    a reference position determination unit that determines a reference position in a first pixel line extending in the first direction and in a first line extending in a second direction perpendicular to the first direction, the reference position being different from another reference position in a second pixel line extending in the first direction and in a second line extending in the second direction, the first line being different from the second line, the reference position to be referred to for determining a pixel as a target to be subjected to correction processing;
    a pixel determination unit that determines the pixel as a target to be subjected to the correction processing, for each of the image areas, according to the random numbers stored in the random number memory and according to the reference position determined by the reference position determination unit, among pixels in each of the image areas; and
    an image width change unit that performs the correction processing on the pixel determined by the pixel determination unit, to change an image width of the image information in the first direction,
    wherein an offset value between the reference position in the second pixel line and the reference position in the first pixel is determined based on a length of the image area in a main scanning direction.

2. The image processing apparatus according to claim 1, wherein
    the random numbers stored in the random number memory are values within a range corresponding to a number of pixels equivalent to a width of each of the image areas,
    the reference position determination unit determines a different reference position for a pixel line extending in the first direction from a reference position determined for another pixel line extending in the first direction, and
    the pixel determination unit determines, as the pixel as a target to be subjected to the correction processing, a pixel positioned distant from the reference position determined by the reference position determination unit in the first direction, by a distance equivalent to a number of pixels corresponding to one of the random numbers stored in the random number memory, in each of the image areas.

3. The image processing apparatus according to claim 2, wherein
    the image segmentation unit divides the image information into image areas so that lengths in the first direction of the image areas divided by the image segmentation unit are not constant.

4. The image processing apparatus according to claim 1, wherein
    the random numbers stored in the random number memory are values within a range of predetermined value smaller than a number of pixels equivalent to a width of each of the image areas,
    the reference position determination unit determines a different reference position for a pixel line extending in the first direction from a reference position determined for another pixel line extending in the first direction, and
    the pixel determination unit determines, as the pixel as a target to be subjected to the correction processing, a pixel positioned distant from the reference position determined by the reference position determination unit in the first direction, by a distance equivalent to a number of pixels corresponding to one of the random numbers stored in the random number memory, in each of the image areas.

5. The image processing apparatus according to claim 4, wherein
    the image segmentation unit divides the image information into image areas so that lengths in the first direction of the image areas divided by the image segmentation unit are not constant.

6. The image processing apparatus according to claim 1, wherein
    the random numbers stored by the random number memory includes a first set of random numbers that are values within a range corresponding to a number of pixels equivalent to a width of each of the image areas, and a second set of random numbers that are values within a range of predetermined values smaller than the number of pixels equivalent to the width of each of the image areas,
    the pixel determination unit comprises
    a first pixel determination unit that determines, as the pixel as a target to be subjected to the correction processing, a pixel positioned distant from the reference position determined by the reference position determination unit in the first direction by a distance equivalent to a number of pixels corresponding to one value of the first set of random numbers,
    a second pixel determination unit that determines, as the pixel as a target to be subjected to the correction processing, a pixel positioned distant from the reference position determined by the reference position determination unit in the first direction by a distance equivalent to a number of pixels corresponding to one value of the second set of random numbers, and
    a select unit that selects one of the first and second pixel determination units, based on a total number of pixels as targets to be subjected to the correction processing in the whole image information; and
    the image width change unit performs the correction processing on the pixel determined by the selected one of the first and second pixel determination units.

7. The image processing apparatus according to claim 6, wherein the image segmentation unit divides the image information into image areas so that lengths in the first direction of the image areas divided by the image segmentation unit are not constant.

8. The image processing apparatus according to claim 1, wherein
the image segmentation unit divides the image information into image areas so that lengths in the first direction of the image areas divided by the image segmentation unit are not constant.

9. An image processing apparatus comprising:
an image segmentation unit that divides image information into image areas in a first direction;
a random number memory that stores random numbers;
a reference position determination unit that determines a reference position in a first pixel line extending in the first direction and in a first line extending in a second direction perpendicular to the first direction, the reference position being different from another reference position in a second pixel line extending in the first direction and in a second line extending in the second direction, the first line being different from the second line, the reference position to be referred to for determining a pixel as a target to be subjected to correction processing;
a pixel determination unit that determines the pixel as a target to be subjected to the correction processing, for each of the image areas, according to the random numbers stored in the random number memory and according to the reference position determined by the reference position determination unit, among pixels in each of the image areas and in another image area substantially contiguous to each of the image areas; and
an image width change unit that performs the correction processing on the pixel determined by the pixel determination unit, to change an image width of the image information in the first direction,
wherein an offset value between the reference position in the second pixel line and the reference position in the first pixel is determined based on a length of the image area in a main scanning direction.

10. The image processing apparatus according to claim 9, wherein
the random numbers stored in the random number memory are values within a range of predetermined values greater than a number of pixels equivalent to a width of each of the image areas, and
the pixel determination unit determines, as the pixel as a target to be subjected to the correction processing, a pixel positioned distant from the reference position determined by the reference position determination unit in the first direction, by a distance equivalent to a number of pixels corresponding to one of the random numbers stored in the random number memory, in each of the image areas and in the another image area contiguous to the each of the image areas.

11. The image processing apparatus according to claim 10, wherein
the image segmentation unit divides the image information into image areas so that lengths in the first direction of the image areas divided by the image segmentation unit are not constant.

12. The image processing apparatus according to claim 9, wherein
the random numbers stored by the random number memory includes a first set of random numbers that are values within a range of predetermined values greater than a number of pixels equivalent to a width of each of the image areas, and a second set of random numbers that are values within a range of predetermined values smaller than the number of pixels equivalent to the width of each of the image areas,
the pixel determination unit comprises
a first pixel determination unit that determines, as the pixel as a target to be subjected to the correction processing, a pixel positioned distant from the reference position determined by the reference position determination unit in the first direction by a distance equivalent to a number of pixels corresponding to one value of the first set of random numbers,
a second pixel determination unit that determines, as the pixel as a target to be subjected to the correction processing, a pixel positioned distant from the reference position determined by the reference position determination unit in the first direction by a distance equivalent to a number of pixels corresponding to one value of the second set of random numbers, and
a select unit that selects one of the first and second pixel determination units, based on a total number of pixels as targets to be subjected to the correction processing in the whole image information; and
the image width change unit performs the correction processing on the pixel determined by the selected one of the first and second pixel determination units.

13. The image processing apparatus according to claim 12, wherein
the image segmentation unit divides the image information into image areas so that lengths in the first direction of the image areas divided by the image segmentation unit are not constant.

14. The image processing apparatus according to claim 9, wherein the image segmentation unit divides the image information into image areas so that lengths in the first direction of the image areas divided by the image segmentation unit are not constant.

15. An image forming apparatus comprising:
an image forming unit that forms an image on a recording sheet, based on image information;
a detection unit that detects a positional dislocation amount of a pixel included in the image formed on the recording sheet by the image forming unit;
an image segmentation unit that divides the image information into image areas in a first direction;
a random number memory that generates and stores random numbers or stores random numbers generated in advance;
a reference position determination unit that determines, based on the positional dislocation amount detected by the detection unit, a reference position in a first pixel line extending in the first direction and in a first line extending in a second direction perpendicular to the first direction, the reference position being different from another reference position in a second pixel line extending in the first direction and in a second line extending in the second direction, the first line being different from the second line, the reference position to be referred to for determining a pixel as a target to be subjected to correction processing;
a pixel determination unit that determines the pixel as a target to be subjected to the correction processing, for each of the image areas, according to the random numbers stored in the random number memory and according to the reference position determined by the reference position determination unit, among pixels in each of the image areas;

an image width change unit that performs the correction processing on the pixel determined by the pixel determination unit, to change an image width of the image information in the first direction; and an output unit that outputs, to the image forming unit, the image information with the image width changed by the image width change unit, wherein an offset value between the reference position in the second pixel line and the reference position in the first pixel is determined based on a length of the image area in a main scanning direction.

16. An image forming apparatus comprising:

an image forming unit that forms an image on a recording sheet, based on image information;

a detection unit that detects a positional dislocation amount of a pixel included in the image formed on the recording sheet by the image forming unit;

an image segmentation unit that divides the image information into image areas in a first direction;

a random number memory that generates and stores random numbers or stores random numbers generated in advance;

a reference position determination unit that determines, based on the positional dislocation amount detected by the detection unit, a reference position in a first pixel line extending in the first direction and in a first line extending in a second direction perpendicular of the first direction, the reference position being different from another reference position in a second pixel line extending in the first direction and in a second line extending in the second direction, the first line being different from the second line, the reference position to be referred to for determining a pixel as a target to be subjected to correction processing;

a pixel determination unit that determines the pixel as a target to be subjected to the correction processing, for each of the image areas, according to the random numbers stored in the random number memory and according to the reference position determined by the reference position determination unit, among pixels in each of the image areas and in another image area contiguous to the each of the image areas;

an image width change unit that performs the correction processing on the pixel determined by the pixel determination unit, to change an image width of the image information in the first direction; and an output unit that outputs, to the image forming unit, the image information with the image width changed by the image width change unit, wherein an offset value between the reference position in the second pixel line and the reference position in the first pixel is determined based on a length of the image area in a main scanning direction.

17. A computer readable non-transitory medium storing a program causing a computer to execute a process for changing an image width, the process comprising:

dividing image information into image areas in a first direction;

generating and storing random numbers or storing random numbers generated in advance;

determining a reference position in a first pixel line extending in the first direction and in a first line extending in a second direction perpendicular to the first direction, the reference position being different from another reference position in a second pixel line extending in the first direction and in a second line extending in the second direction, the reference position to be referred to for determining a pixel as a target to be subjected to correction processing;

determining the pixel as a target to be subjected to the correction processing, for each of the image areas, according to the stored random numbers and according to the determined reference position, among pixels in each of the image areas; and performing the correction processing on the determined pixel to change an image width of the image information in the first direction, wherein an offset value between the reference position in the second pixel line and the reference position in the first pixel is determined based on a length of the image area in a main scanning direction.

18. A computer readable non-transitory medium storing a program causing a computer to execute a process for changing an image width, the process comprising:

dividing image information into image areas in a first direction;

generating and storing random numbers or storing random numbers generated in advance;

determining a reference position in a first pixel line extending in the first direction and in a first line extending in a second direction perpendicular to the first direction, the reference position being different from another reference position in a second pixel line extending in the first direction and in a second line extending in the second direction, the reference position to be referred to for determining a pixel as a target to be subjected to correction processing;

determining the pixel as a target to be subjected to the correction processing, for each of the image areas, according to the stored random numbers and according to the determined reference position, among pixels in each of the image areas and in another image area contiguous to the each of the image areas; and performing the correction processing on the determined pixel to change an image width of the image information in the first direction, wherein an offset value between the reference position in the second pixel line and the reference position in the first pixel is determined based on a length of the image area in a main scanning direction.

19. An image processing method in a computer including a processor and a memory, the method comprising:

dividing, by the processor, image information into image areas in a first direction;

storing, in the memory, random numbers;

determining, by the processor, a reference position in a first pixel line extending in the first direction and in a first line extending in a second direction perpendicular to the first direction, the reference position being different from another reference position in a second pixel line extending in the first direction and in a second line extending in the second direction, the reference position to be referred to for determining a pixel as a target to be subjected to correction processing;

determining, by the processor, the pixel as a target to be subjected to the correction processing for each of the image areas, according to the random numbers stored in the random number memory and according to the determined reference position among pixels in the each of the image areas; and performing, by the processor, the correction processing on the determined pixel determined by the pixel determination unit, to change an image width of the image information in the first direction, wherein an offset value between the reference position in the second pixel line and the reference position in the first pixel is determined based on a length of the image area in a main scanning direction.

20. An image processing method in a computer including a processor and a memory, the method comprising:

dividing, by the processor, image information into image areas in a first direction;

storing, in the memory, random numbers;

determining, by the processor, a reference position in a first pixel line extending in the first direction and in a first line extending in a second direction perpendicular to the first direction, the reference position being different from another reference position in a second pixel line extending in the first direction and in a second line extending in the second direction, the reference position to be referred to for determining a pixel as a target to be subjected to correction processing;

determining, by the processor, the pixel as a target to be subjected to the correction processing, for each of the image areas, according to the random numbers stored in the random number memory and according to the determined reference position, among pixels in the each of the image areas and in another image area contiguous to the each of the image areas; and performing, by the processor, the correction processing on the determined pixel, to change an image width of the image information in the first direction, wherein an offset value between the reference position in the second pixel line and the reference position in the first pixel is determined based on a length of the image area in a main scanning direction.

* * * * *